US011148696B2

(12) United States Patent
Malghan et al.

(10) Patent No.: US 11,148,696 B2
(45) Date of Patent: Oct. 19, 2021

(54) ASSISTIVE ROBOTS INCLUDING ASSEMBLIES FOR ACCOMMODATING OBSTACLES AND METHODS FOR USING THE SAME

(71) Applicant: Toyota Research Institute, Inc., Los Altos, CA (US)

(72) Inventors: Suhas Malghan, Swampscott, MA (US); Joseph Bondaryk, Brookline, MA (US); Paul W. Baim, Natick, MA (US); Toffee Albina, Cambridge, MA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 114 days.

(21) Appl. No.: 16/560,252

(22) Filed: Sep. 4, 2019

(65) Prior Publication Data
US 2020/0207394 A1 Jul. 2, 2020

Related U.S. Application Data

(60) Provisional application No. 62/785,298, filed on Dec. 27, 2018.

(51) Int. Cl.
B62B 3/16 (2006.01)
B62B 3/02 (2006.01)
(Continued)

(52) U.S. Cl.
CPC .............. B62B 3/165 (2013.01); B62B 3/027 (2013.01); B62B 5/02 (2013.01); B62D 57/024 (2013.01);
(Continued)

(58) Field of Classification Search
CPC .......... B62B 3/165; B62B 3/027; B62B 5/02; B62B 5/023; B62B 2301/256; A61G 5/061; A61G 5/066; B62D 55/075
See application file for complete search history.

(56) References Cited

U.S. PATENT DOCUMENTS 3,166,138 A * 1/1965 Dunn, Jr. ............. B62D 55/075
180/9.23
4,130,291 A * 12/1978 Saethre ................... B62B 5/025
280/5.22
(Continued)

FOREIGN PATENT DOCUMENTS

CA 2949306 A1 5/2018
CN 101897641 12/2011
(Continued)

OTHER PUBLICATIONS

McGinn, Conor, et al., "Design of a terrain adaptive wheeled robot for human-orientated environments," https://link.springer.com/article/10.1007/s10514-018-9701-1; Published Date: Feb. 13, 2018.
(Continued)

Primary Examiner — Brian L Swenson
(74) Attorney, Agent, or Firm — Dinsmore & Shohl LLP

(57) ABSTRACT

An assistive robot includes a manipulator, a base coupled to the manipulator, the base defining a front end and a rear end positioned opposite the front end, the base including a chassis body, a front conveyor assembly positioned at the front end of the base, the front conveyor assembly including a front conveyor defining a conveyor pathway that extends at least partially within the chassis body and a front toe extending outward from the front conveyor, and a rear conveyor assembly positioned at the rear end of the base, the rear conveyor assembly including a rear conveyor defining a conveyor pathway that extends at least partially within the
(Continued)

chassis body and a rear toe extending outward from the rear conveyor.

13 Claims, 16 Drawing Sheets

(51) Int. Cl.
  *B62D 57/024* (2006.01)
  *G05D 1/02* (2020.01)
  *B62B 5/02* (2006.01)
(52) U.S. Cl.
  CPC ......... *G05D 1/0217* (2013.01); *G05D 1/0238* (2013.01); *B62B 2203/10* (2013.01); *B62B 2206/06* (2013.01)

(56) References Cited

U.S. PATENT DOCUMENTS

| | | | |
|---|---|---|---|
| 5,036,929 A * | 8/1991 | Trougouboff | A61G 5/061 180/8.2 |
| 6,113,343 A | 9/2000 | Goldenberg et al. | |
| 6,328,120 B1 | 12/2001 | Haeussler et al. | |
| 6,523,629 B1 | 2/2003 | Buttz et al. | |
| 6,644,426 B1 | 11/2003 | Larue | |
| 6,896,078 B2 | 5/2005 | Wakui | |
| 7,137,464 B2 | 11/2006 | Stahler | |
| 7,152,869 B2 | 12/2006 | Dupay et al. | |
| 7,424,923 B2 | 9/2008 | Yang et al. | |
| 7,426,970 B2 | 9/2008 | Olsen | |
| 7,434,638 B2 | 10/2008 | Tanielian | |
| 7,475,745 B1 | 1/2009 | DeRoos | |
| 7,581,746 B2 | 9/2009 | Abate et al. | |
| 7,645,110 B2 | 1/2010 | Ogawa et al. | |
| 7,721,829 B2 | 5/2010 | Lee et al. | |
| 8,066,298 B2 | 11/2011 | Alguera et al. | |
| 8,083,013 B2 | 12/2011 | Bewley et al. | |
| 8,162,351 B2 | 4/2012 | Lee et al. | |
| 8,307,923 B2 | 11/2012 | Lin et al. | |
| 8,360,178 B2 | 1/2013 | Goldenberg et al. | |
| 8,753,155 B2 | 6/2014 | Olm et al. | |
| 8,840,128 B2 | 9/2014 | Glazner | |
| 8,840,130 B2 | 9/2014 | Columbia | |
| 8,875,815 B2 | 11/2014 | Terrien et al. | |
| 8,915,692 B2 | 12/2014 | Grinnell et al. | |
| 9,032,831 B2 | 5/2015 | Sutherland | |
| 9,096,281 B1 | 8/2015 | Li et al. | |
| 9,248,875 B2 | 2/2016 | Wolf et al. | |
| 9,248,876 B2 | 2/2016 | Nuchter et al. | |
| 9,283,681 B2 | 3/2016 | Slawinski et al. | |
| 9,314,921 B2 | 4/2016 | Jacobsen et al. | |
| 9,314,929 B2 | 4/2016 | Hyde et al. | |
| 9,387,892 B2 | 7/2016 | Gettings et al. | |
| 9,387,895 B1 | 7/2016 | Theobald et al. | |
| 9,463,574 B2 | 10/2016 | Purkayastha et al. | |
| 9,475,193 B2 | 10/2016 | Bosscher et al. | |
| 9,527,213 B2 | 12/2016 | Luo et al. | |
| 9,586,636 B1 | 3/2017 | Burmeister et al. | |
| 9,616,948 B2 | 4/2017 | Ben-Tzvi et al. | |
| 9,724,829 B2 | 8/2017 | Hyde et al. | |
| 9,726,268 B1 | 8/2017 | Krasowski et al. | |
| 9,776,333 B2 | 10/2017 | Sakai et al. | |
| 9,808,383 B2 | 11/2017 | Mulhern et al. | |
| 9,902,069 B2 | 2/2018 | Farlow et al. | |
| 2003/0137268 A1 | 7/2003 | Papanikolopoulos et al. | |
| 2003/0183428 A1 * | 10/2003 | Hedeen | A61G 5/061 180/9.32 |
| 2006/0037789 A1 * | 2/2006 | Kritman | A61G 5/061 180/9.32 |
| 2008/0302586 A1 | 12/2008 | Yan | |
| 2010/0025964 A1 | 2/2010 | Fisk et al. | |
| 2011/0175302 A1 * | 7/2011 | Sherman | B62B 5/02 280/5.22 |
| 2013/0231814 A1 | 9/2013 | Sarokhan et al. | |
| 2014/0379198 A1 | 12/2014 | Amino et al. | |
| 2016/0311479 A1 | 10/2016 | Rudakevych et al. | |
| 2017/0066132 A1 | 3/2017 | Casey et al. | |
| 2017/0280960 A1 | 10/2017 | Ziegler et al. | |
| 2018/0043530 A1 | 2/2018 | Oldenberg et al. | |
| 2018/0065242 A1 | 3/2018 | Tanaka et al. | |
| 2018/0071909 A1 | 3/2018 | Bewley et al. | |
| 2018/0079440 A1 * | 3/2018 | Muscocea | B62B 1/12 |
| 2019/0232992 A1 | 8/2019 | Bondaryk et al. | |
| 2020/0000659 A1 * | 1/2020 | Linscott | A61G 5/068 |

FOREIGN PATENT DOCUMENTS

| | | |
|---|---|---|
| CN | 101712199 B | 7/2012 |
| CN | 102718012 B | 11/2014 |
| CN | 203993868 U | 12/2014 |
| CN | 103568018 B | 9/2015 |
| CN | 105598937 A | 5/2016 |
| CN | 105666474 A | 6/2016 |
| CN | 105269593 B | 8/2016 |
| CN | 205441615 U | 8/2016 |
| CN | 106272478 A | 1/2017 |
| CN | 206296921 U | 7/2017 |
| CN | 107150336 A | 9/2017 |
| CN | 206748412 U | 12/2017 |
| CN | 107618026 A | 1/2018 |
| CN | 207669294 U | 7/2018 |
| CN | 108466278 A | 8/2018 |
| EP | 1290935 B1 | 9/2006 |
| JP | 2885367 B2 | 4/1999 |
| JP | 2001225754 | 8/2001 |
| JP | 2004195592 A | 7/2004 |
| JP | 2009166181 A | 7/2009 |
| JP | 2017164872 A | 9/2017 |
| WO | 2014162605 | 10/2014 |
| WO | 2017088048 | 6/2017 |
| WO | 2017191591 A1 | 11/2017 |

OTHER PUBLICATIONS

"StairKing battery powered stair climbing appliance truck," https://catalog.wescomfg.com/item/all-categories/liftkar-hd-stairking-and-stair-climbing-trucks/230051-1?plpver=1001 Accessed Date: Sep. 19, 2018.

"Toru", Sep. 19, 2018; URL: https://www.magazino.eu/toru-cube/?lang=en.

The Difference Between Cartesian, Six-Axis, and SCARA Robots, Machine Design, published Dec. 2, 2013.

* cited by examiner

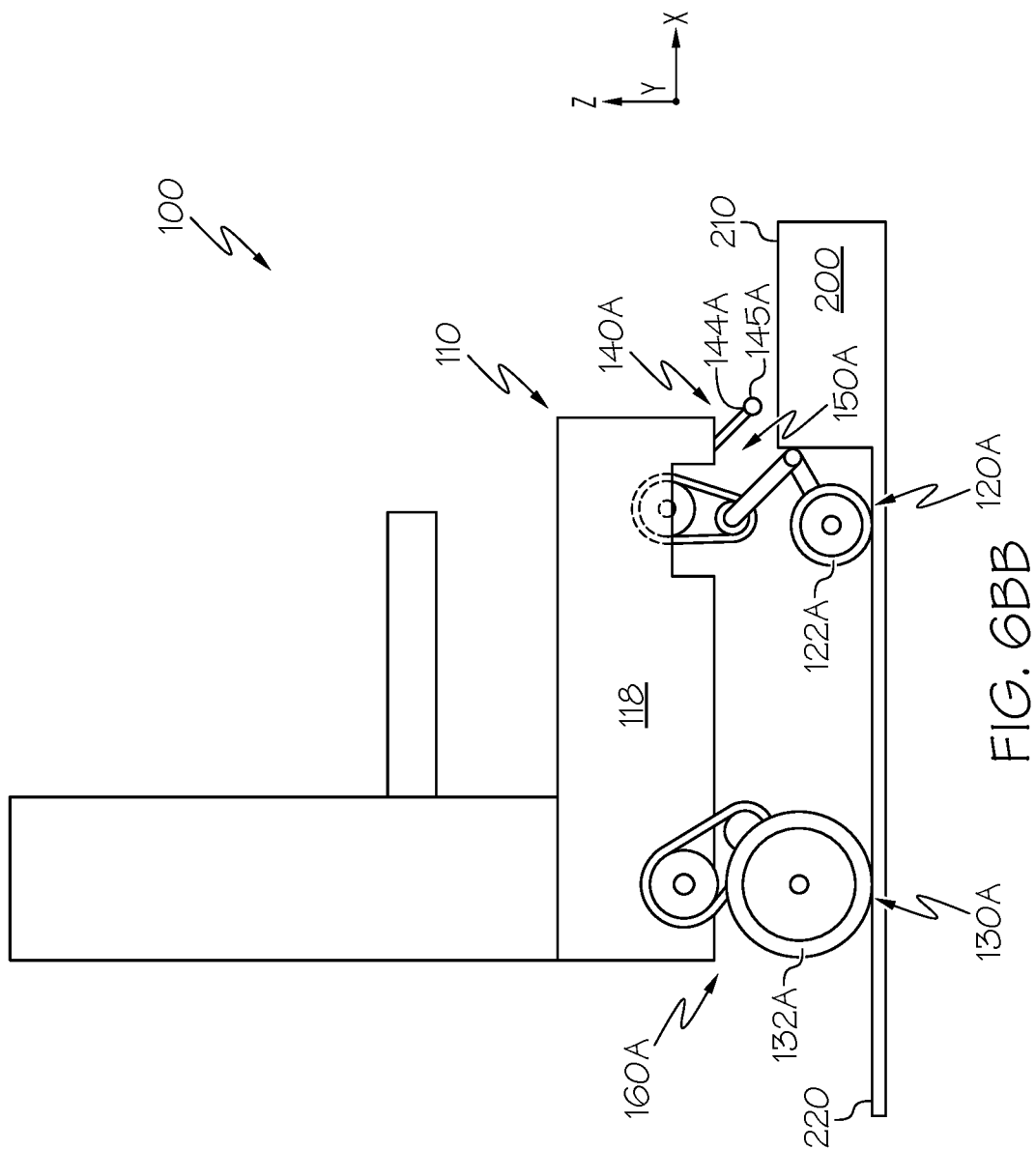

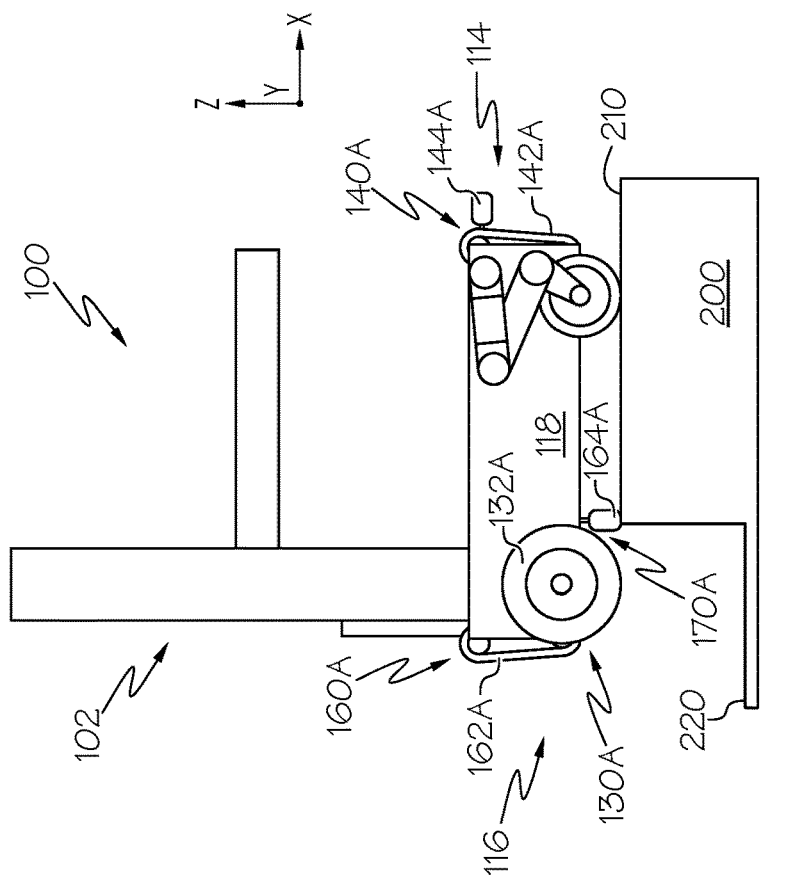
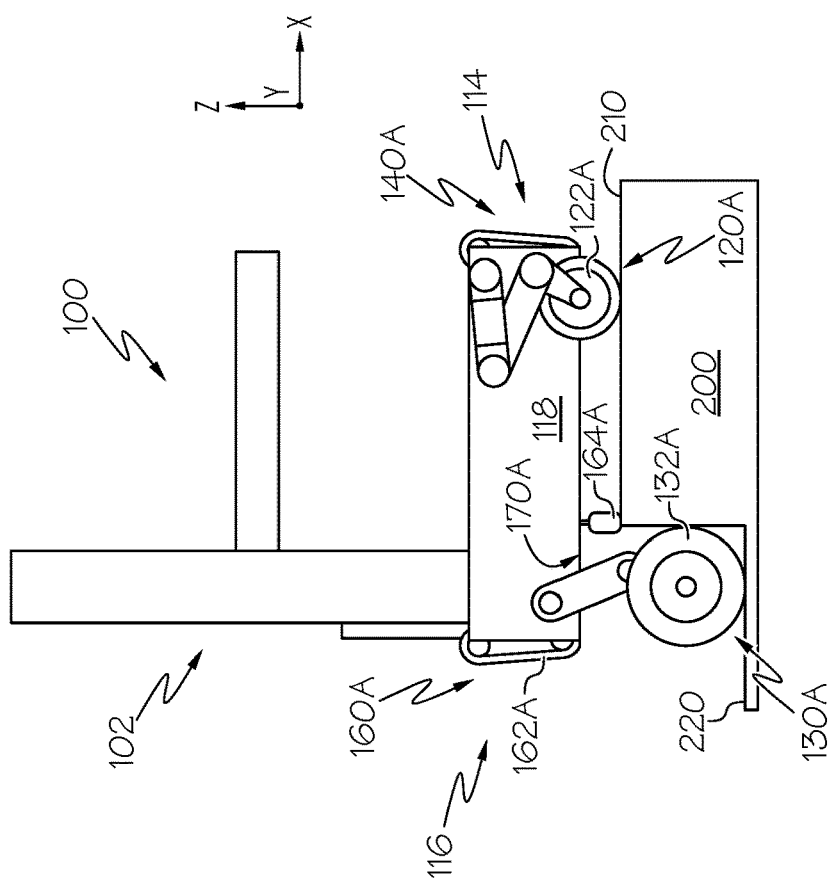
FIG. 6E
FIG. 6F

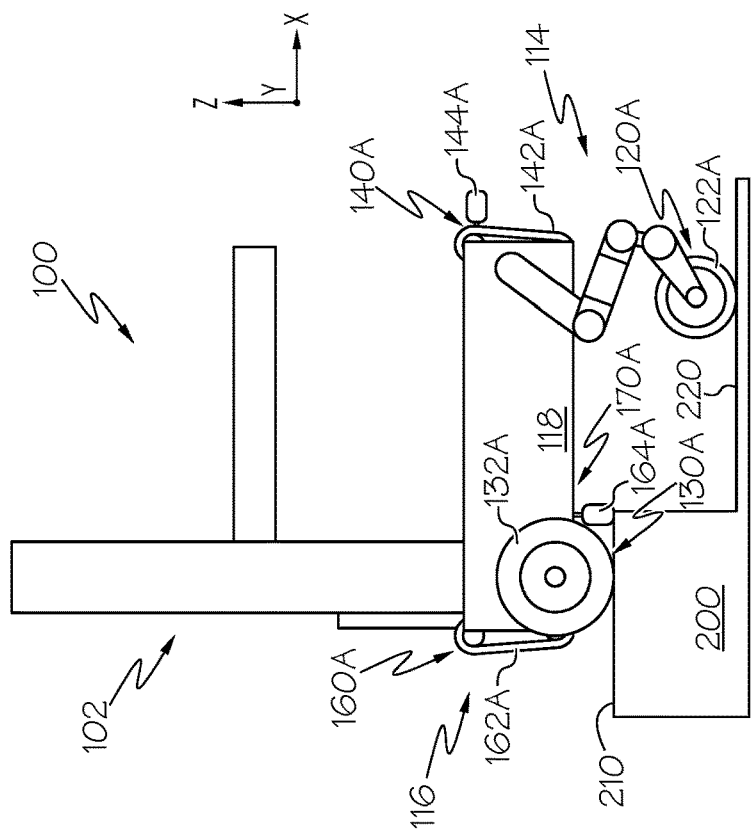
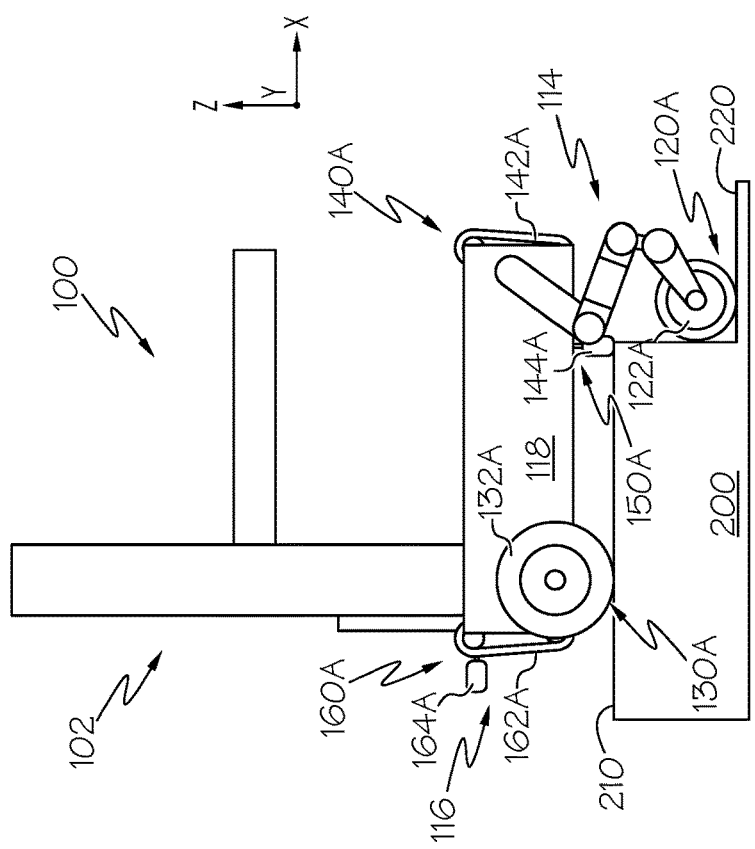
FIG. 7C
FIG. 7D

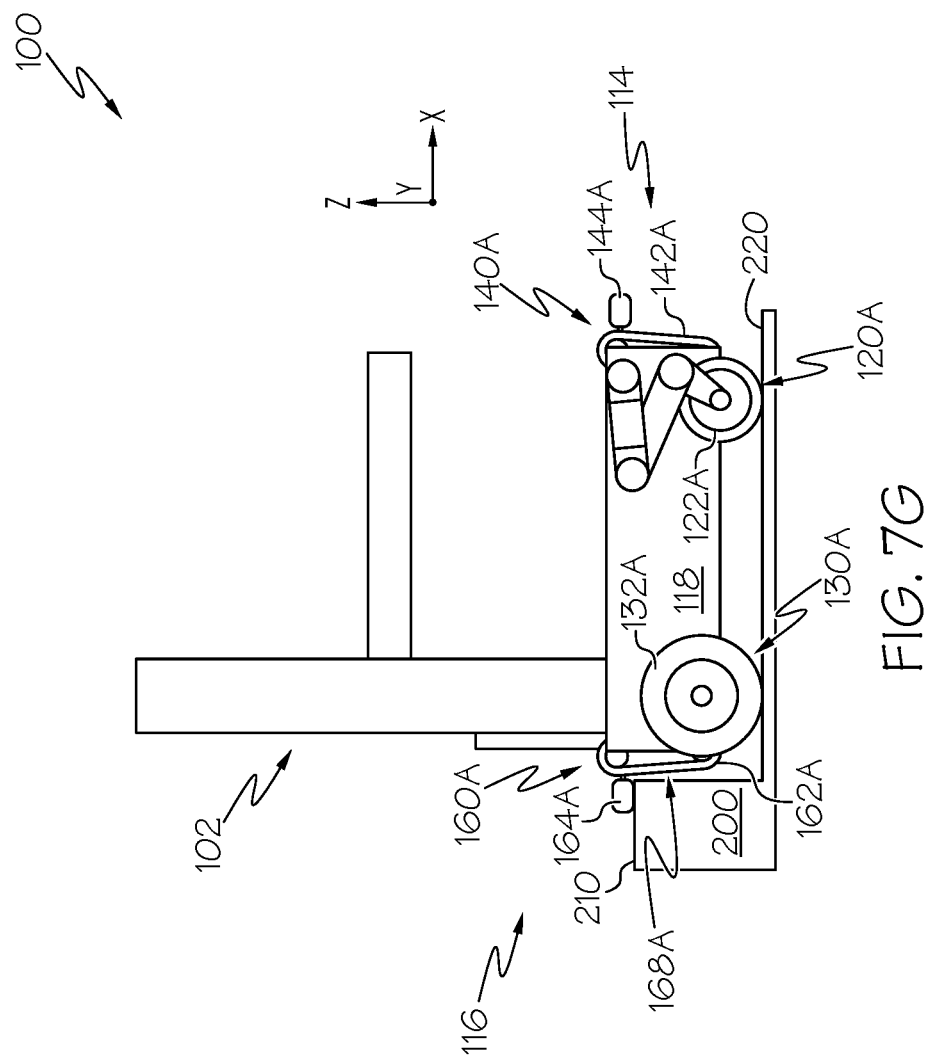

ASSISTIVE ROBOTS INCLUDING ASSEMBLIES FOR ACCOMMODATING OBSTACLES AND METHODS FOR USING THE SAME

CROSS-REFERENCE TO RELATED APPLICATIONS

This application claims the benefit of U.S. Provisional Patent Application No. 62/785,298 filed Dec. 27, 2018 and entitled "Assistive Robots Including Elevator Assemblies and Methods for Using the Same," the entire contents of which are incorporated herein.

TECHNICAL FIELD

The present specification generally relates to assistive robots including assemblies for accommodating obstacles, and more particularly to assemblies that facilitate moving assistive robots up and down obstacles in either direction, such as curbs, platforms, thresholds, and steps.

BACKGROUND

Assistive robots may be utilized to assist users in everyday tasks and may assist the user in walking between locations. For example, robots may accompany users to various locations, such as a grocery store to assist the user in grocery shopping. Conventional robots may include wheels, tracks, or the like to provide the robots with mobility to accompany users to the various locations.

Many stores, homes, and other locations may include a curb, a step, or other such obstacle inside and/or near the location, such as at an entrance of the location. However, conventional robots may be primarily configured to traverse flat surfaces, such as the floor of a shopping mall, and it may be difficult for conventional robots to traverse even small obstacles. For example, conventional robots may not be able to traverse even small height discontinuities. As such, the ability of conventional assistive robots to accompany and assist a user may be limited.

Accordingly, a need exists for assistive robots including features for accommodating obstacles, such as a step or curb.

SUMMARY

In one embodiment, an assistive robot includes a manipulator, a base coupled to the manipulator, the base defining a front end and a rear end positioned opposite the front end, the base including a chassis body, a front conveyor assembly positioned at the front end of the base, the front conveyor assembly including a front conveyor defining a conveyor pathway that extends at least partially within the chassis body and a front toe extending outward from the front conveyor, and a rear conveyor assembly positioned at the rear end of the base, the rear conveyor assembly including a rear conveyor defining a conveyor pathway that extends at least partially within the chassis body and a rear toe extending outward from the rear conveyor.

In another embodiment, a vehicle includes a base defining a front end and a rear end positioned opposite the front end, the base including a chassis body, a front conveyor assembly positioned at the front end of the base, the front conveyor assembly including a front conveyor defining a conveyor pathway that extends at least partially within the chassis body and a front toe extending outward from the front conveyor, and a rear conveyor assembly positioned at the rear end of the base, the rear conveyor assembly including a rear conveyor defining a conveyor pathway that extends at least partially within the chassis body and a rear toe extending outward from the rear conveyor, and a front wheel assembly positioned at the front end of the base and coupled to the chassis body, the front wheel assembly including a front wheel, and a controller communicatively coupled to the front conveyor assembly, the rear conveyor assembly, and the front wheel assembly, the controller including a processor and a computer readable and executable instruction set, which when executed, causes the processor to direct the vehicle to move toward an obstacle, direct the vehicle to move upward in a vertical direction such the obstacle is positioned below the conveyor pathway of the front conveyor, direct the front conveyor assembly to engage the front toe with the obstacle, direct the front conveyor assembly to move the front conveyor and the front toe in a rearward direction to move the vehicle over the obstacle, and direct the rear conveyor assembly to engage the rear toe of the rear conveyor with the obstacle.

In another embodiment, a method for moving an assistive robot down from an obstacle, includes moving the assistive robot toward an edge of the obstacle, the assistive robot including a manipulator, engaging a front toe with the obstacle, the front toe extending outward from a front conveyor of the assistive robot, moving the front conveyor and the front toe in a rearward direction to move the assistive robot over the obstacle, moving a front wheel of the assistive robot from a retracted position into an extended position to engage a surface positioned below the obstacle, engaging a rear toe of a rear conveyor of the assistive robot with the obstacle, and moving the assistive robot downward in a vertical direction toward the surface below the obstacle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6BB schematically depicts another side view of the assistive robot of FIG. 1 moving upward in the vertical direction with respect to the obstacle, according to one or more embodiments shown and described herein, according to one or more embodiments shown and described herein;

FIG. 6E schematically depicts a side view of a rear toe of the assistive robot of FIG. 1 engaged with the obstacle, according to one or more embodiments shown and described herein;

FIG. 6F schematically depicts a side view of the rear toe of the assistive robot of FIG. 1 moving rearward in the longitudinal direction, according to one or more embodiments shown and described herein;

FIG. 7C schematically depicts a side view of the front wheel of the assistive robot of FIG. 1 engaged with a surface below the obstacle, according to one or more embodiments shown and described herein;

FIG. 7D schematically depicts a side view of the rear toe of the assistive robot of FIG. 1 engaged with the obstacle, according to one or more embodiments shown and described herein;

FIG. 7G schematically depicts a side view of the rear wheel of the assistive robot of FIG. 1 positioned on the surface below the obstacle, according to one or more embodiments shown and described herein.

DETAILED DESCRIPTION

Embodiments described herein are generally related to assistive robots including assemblies that assist in moving the assistive robot upward onto and downward from an obstacle. Conventional assistive robots may be unable to traverse relatively high obstacles, such as curbs or steps. For example, conventional assistive robots may be unable to traverse obstacles and/or may be unable to maintain a stable and level orientation when traversing obstacles.

Conveyor assemblies of the assistive robots disclosed herein include conveyors and toes that extend outward from the conveyors. The toes may be selectively engaged with the obstacle to support the assistive robot as wheels of the robot are moved between an extended position and a retracted position to move the assistive robot upward onto, along, and downward from an obstacle. Through the coordinated movement of the wheels of the assistive robot and the assemblies, assistive robots according to the present disclosure may traverse obstacles while maintaining a stable and level orientation, as may be desired when the assistive robot is carrying items for a user. Various embodiments of assistive robots including assemblies and methods for operating the same will be described herein with specific reference to the appended drawings.

Definitions

Figure 1A:
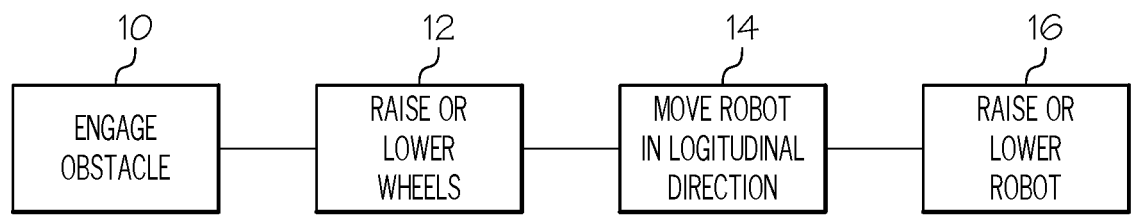
FIG. 1A schematically depicts a block diagram of a method for operating an assistive robot, according to one or more embodiments shown and described herein.
Figure 1B:
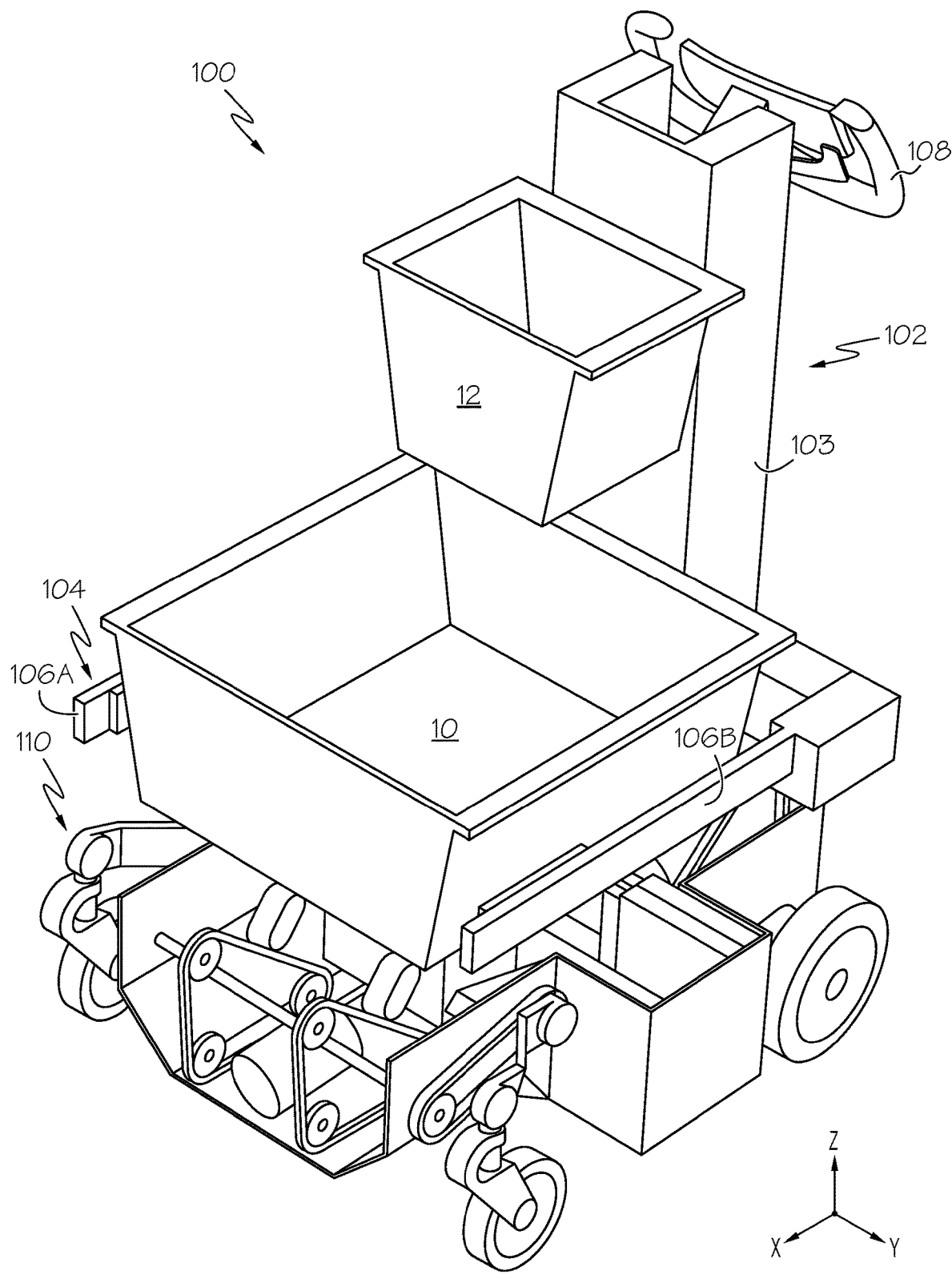
FIG. 1B schematically depicts perspective view of an example assistive robot, according to one or more embodiments shown and described herein.

"Longitudinal direction" refers to the forward-rearward direction of components of the assistive robot (i.e., in the +/−X-direction depicted in FIG. 1B).

"Lateral direction" refers to the cross-wise direction of components of the assistive robot (i.e., in the +/−Y-direction depicted in FIG. 1B), and is transverse to the longitudinal direction.

"Vertical direction" refers to the upward-downward direction of components of the assistive robot (i.e., in the +/−Z-direction depicted in FIG. 1B).

"Conveyor assemblies" refers to one or more assemblies of the assistive robot structurally configured to assist in moving the assistive robot onto or off of an obstacle.

"Toes" refers to components extending outward from the conveyor assemblies, the toes being structurally configured to engage an obstacle.

Referring to FIGS. 1A and 1B a method for accommodating an obstacle is generally depicted. In a first block 10, the assistive robot 100 engages the obstacle. As described in greater detail herein, one or more toes of the assistive robot 100 may engage the obstacle, supporting the assistive robot 100 on the obstacle. At block 12, wheels of the assistive robot 100 may be raised or lowered onto or off of the obstacle. At blocks 14 and 16, the assistive robot 100 is moved in the longitudinal direction and is raised or lowered onto or off of the obstacle, as described in greater detail herein. Assistive robots 100, as detailed herein, are capable of accommodating obstacles in either a forward or rearward direction, such that the assistive robot 100 does not need to turn around to move on to or off of an obstacle.

Referring to FIG. 1B, the example assistive robot 100 is schematically depicted. It should be understood that the assistive robot 100 shown in FIG. 1B is for illustrative purposes, and embodiments are not limited. For example, wheel assemblies and conveyor assemblies described herein can be utilized on other motorized vehicles or devices. The assistive robot 100 generally includes a manipulator 102 that is positioned on a base 110. The manipulator 102 generally includes a column 103 and a gripper assembly 104, which in the embodiment depicted in FIG. 1B includes a pair of opposing arms 106A, 106B positioned on the column 103. The opposing arms 106A, 106B, in embodiments, are movable with respect to the column 103 in the vertical direction (i.e., in the Z-direction as depicted), in the longitudinal direction (i.e., in the X-direction as depicted), and in the lateral direction (i.e., in the Y-direction as depicted). The opposing arms 106A, 106B may move either toward or away from one another in the lateral direction to grasp and retrieve objects.

For example, in embodiment depicted in FIG. 1B, bins 10, 12 are positioned on the manipulator 102. More particularly, the bins 10, 12 may be removably engaged with the column 103, and the opposing arms 106A, 106B may grasp the bins 10, 12 and engage the bins 10, 12 with the column 103 and/or may grasp objects to be positioned in the bins 10, 12. By grasping and engaging the bins 10, 12 with the column 103 and/or by grasping and positioning objects within the bins 10, 12, the opposing arms 106A, 106B may assist a user in performing everyday tasks. As one example, the assistive robot 100 may accompany a user into a shopping environment (e.g., a store) to assist the user. The assistive robot 100 may retrieve objects (e.g., via the opposing arms 106A, 106B), such as from a shelf within the shopping environment, which may otherwise be difficult for some users to retrieve. While the embodiment depicted in FIG. 1B the assistive robot 100 includes the opposing arms 106A, 106B, in embodiments, the assistive robot 100 may include any suitable end effector for retrieving objects, for example and without limitation, jaws, pins, needles, a vacuum or vacuums, a magnet or magnets, an electromagnet or electromagnets, adhesives, or the like.

In the embodiment depicted in FIG. 1B, the assistive robot 100 further includes a handle 108 positioned on the column 103. The handle 108 may provide a grip that the user may grasp for balance. In some embodiments, the handle 108 may include a user input device, such that the user may direct operation of the assistive robot 100. For example, in some embodiments, the assistive robot 100 may be user-controlled, such that the assistive robot 100 may move in response to receiving user-generated input. In some embodiments, the assistive robot 100 may be semi-autonomous or fully autonomous.

Figure 2:
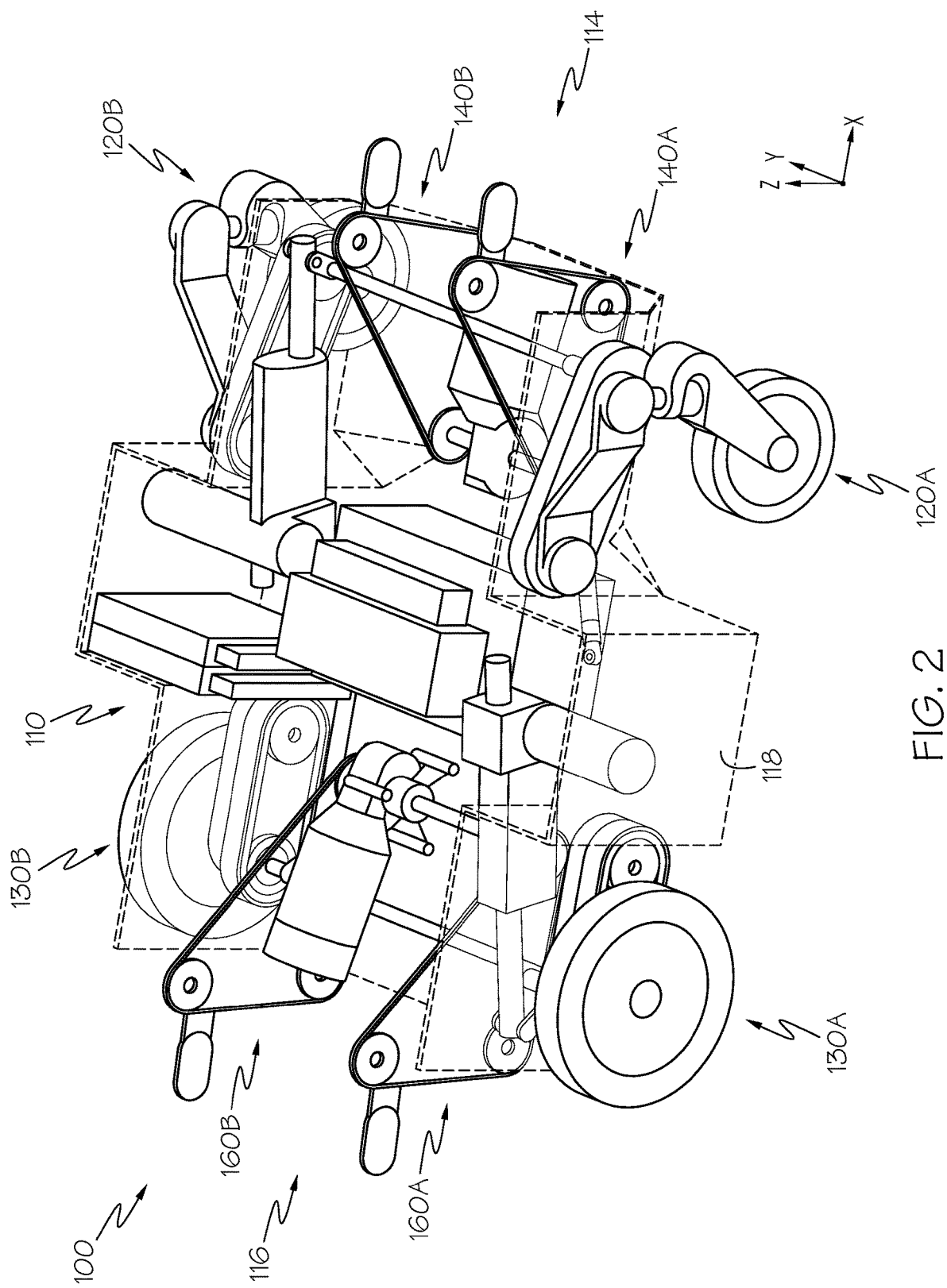
FIG. 2 schematically depicts a perspective view of a base of the assistive robot of FIG. 1, according to one or more embodiments shown and described herein.

Referring to FIG. 2, a perspective view of the base 110 is depicted in isolation. The base 110 generally includes a chassis body 118 that extends between a front end 114 and a rear end 116 positioned opposite the front end 114 in the longitudinal direction. The base 110 further includes a first and second front conveyor assembly 140A, 140B positioned at the front end 114 of the base 110 and a first and second rear conveyor assembly 160A, 160B positioned at the rear end 116 of the base 110. The first and second front conveyor assemblies 140A, 140B and the first and second rear conveyor assemblies 160A, 160B assist the assistive robot 100 in overcoming obstacles, as described in greater detail herein. The base 110 generally includes a first and second front wheel assembly 120A, 120B coupled to the chassis body 118 at the front end 114 of the base 110 and a first and second rear wheel assembly 130A, 130B coupled to the chassis body 118 at the rear end 116 of the base 110.

Figure 3:
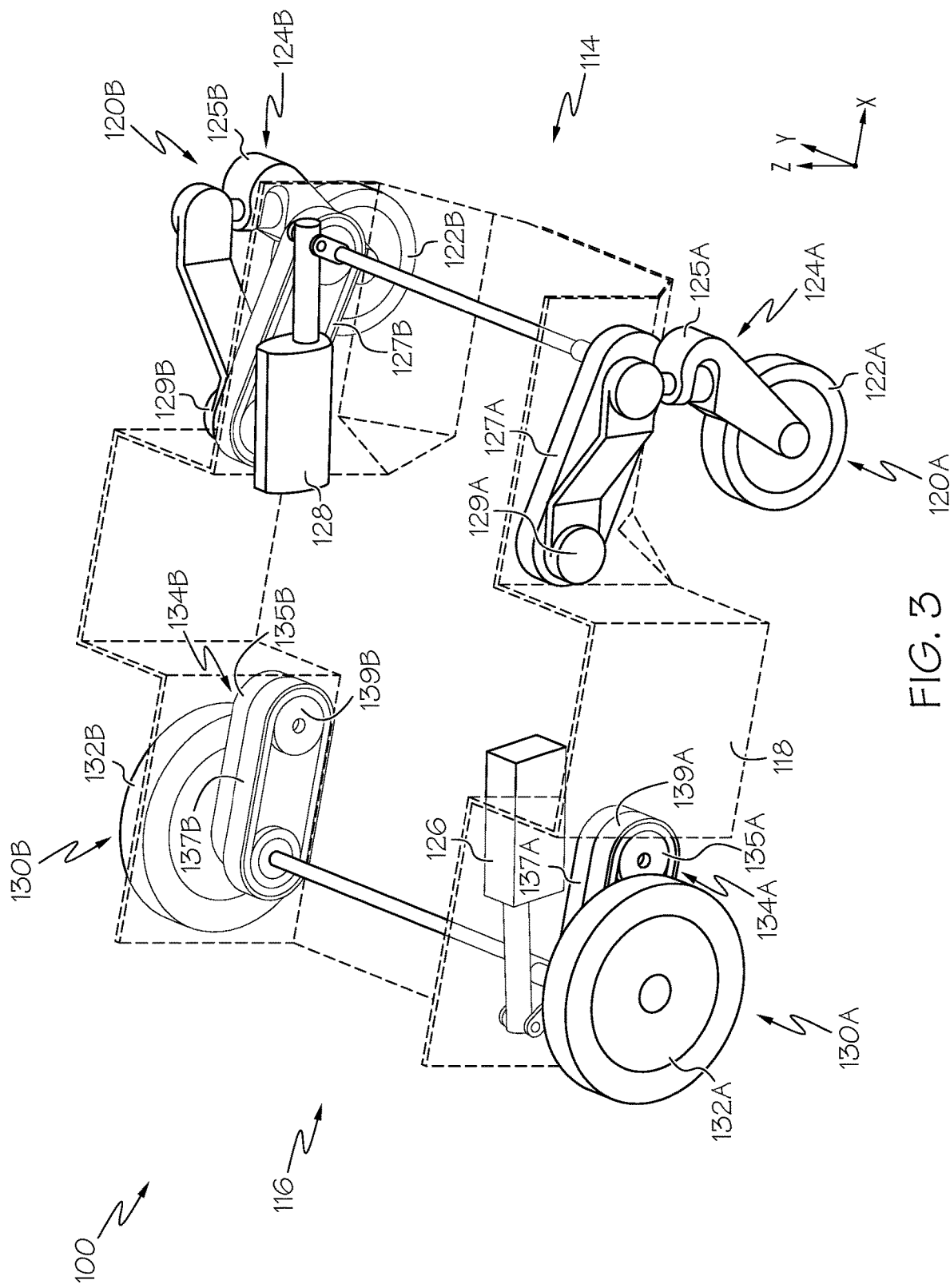
FIG. 3 schematically depicts a perspective view of wheel assemblies of the assistive robot of FIG. 1 in isolation, according to one or more embodiments shown and described herein.

Referring to FIG. 3, a perspective view of the base 110 is depicted with the first and second front wheel assemblies 120A, 120B and the first and second rear wheel assemblies 130A, 130B shown in isolation. The first and second front wheel assemblies 120A, 120B generally include a first and second front wheel 122A, 122B, respectively, and first and second linkage arms 124A, 124B that couple the first and second front wheels 122A, 122B to the chassis body 118. For example, in the embodiment depicted in FIG. 3, the first linkage arm 124A includes a first wheel arm 125A that is coupled to the first front wheel 122A, and a first chassis arm 127A that is coupled to the chassis body 118. The first wheel arm 125A is pivotally coupled to the first chassis arm 127A at a first pivot 129A. Through rotation of the first wheel arm 125A with respect to the first chassis arm 127A about the first pivot 129A (e.g., about the Y-direction as depicted), and through rotation of the first chassis arm 127A with respect to the chassis body 118, the first front wheel 122A is movable with respect to the chassis body 118 in the vertical direction. Similarly, the second linkage arm 124B includes a second wheel arm 125B that is coupled to the second front wheel 122B, and a second chassis arm 127B that is coupled to the chassis body 118. The second wheel arm 125B is pivotally coupled to the second chassis arm 127B at a second pivot 129B. Through rotation of the second wheel arm 125B with respect to the second chassis arm 127B about the second pivot 129B (e.g., about the Y-direction as depicted), and through rotation of the second chassis arm 127B with respect to the chassis body 118, the second front wheel 122B is movable with respect to the chassis body 118 in the vertical direction.

Similar to the first and second front wheel assemblies 120A, 120B, the first and second rear wheel assemblies 130A include a first and second rear wheel 132A, 132B, respectively, and a first and second linkage arm 134A, 134B that couple the first and second rear wheels 132A, 132B to the chassis body 118. For example, in the embodiment depicted in FIG. 3, the first linkage arm 134A includes a first wheel arm 135A that is coupled to the first rear wheel 132A, and a first chassis arm 137A that is coupled to the chassis body 118. The first wheel arm 135A is pivotally coupled to the first chassis arm 137A at a first pivot 139A. Through rotation of the first wheel arm 135A with respect to the first chassis arm 137A about the first pivot 139A (e.g., about the Y-direction as depicted), and through rotation of the first chassis arm 137A with respect to the chassis body 118, the first rear wheel 132A is movable with respect to the chassis body 118 in the vertical direction. Similarly, the second linkage arm 134B includes a second wheel arm 135B that is coupled to the second rear wheel 132B, and a second chassis arm 137B that is coupled to the chassis body 118. The second wheel arm 135B is pivotally coupled to the second chassis arm 137B at a second pivot 139B. Through rotation of the second wheel arm 135B with respect to the second chassis arm 137B about the second pivot 139B (e.g., about the Y-direction as depicted), and through rotation of the second chassis arm 137B with respect to the chassis body 118, the second rear wheel 132B is movable with respect to the chassis body 118 in the vertical direction.

As the first and second front wheels 122A, 122B and the first and second rear wheels 132A, 132B are movable with respect to the chassis body 118, the first and second front wheels 122A, 122B and the first and second rear wheels 132A, 132B are each repositionable between a retracted position, and an extended position in which the first and second front wheels 122A, 122B and the first and second rear wheels 132A, 132B are positioned closer to the chassis body 118 of the assistive robot 100 in the retracted position as compared to the extended position. By moving the first and second front wheels 122A, 122B and the first and second rear wheels 132A, 132B between the retracted and the extended position, the assistive robot 100 may move upward onto and downward from an obstacle, such as a step, as described in greater detail herein. While in the embodiment depicted in FIG. 3, the assistive robot 100 is depicted as including the first and second linkage arms 124A, 124B and the first and second linkage arms 134A, 134B, it should be understood that other manners of moving the first and second front wheels 122A, 122B and the first and second rear wheels 132A, 132B between the retracted and the extended position are contemplated. For example and without limitation the assistive robot 100 may include single articulating linkage arms, articulating linkage arms with multiple segments, telescoping linkage arms, or the like connected to the first and second front wheels 122A, 122B and the first and second rear wheels 132A, 132B.

While in the embodiment depicted in FIG. 3 the assistive robot 100 includes the first and second front wheel assemblies 120A, 120B and the first and second rear wheel assemblies 130A, 130B, in embodiments, the assistive robot 100 may include any suitable number of front wheel assemblies and rear wheel assemblies. For example in some embodiments, the assistive robot 100 may include a single front wheel assembly with a pair of rear wheel assemblies or a single rear wheel assembly with a pair of front wheel assemblies (e.g., a tripod configuration). In some embodiments, the assistive robot 100 may include a single front wheel assembly and a single rear wheel assembly and the assistive robot 100 may include gyroscopes or the like to balance the assistive robot 100. In some embodiments, the assistive robot 100 may include multiple front wheel assemblies and multiple rear wheel assemblies.

In embodiments, the assistive robot 100 includes one or more actuators or devices that facilitate movement of the first and second front wheel assemblies 120A, 120B, and the first and second rear wheel assemblies 130A, 130B with respect to the chassis body 118. For example, in the embodiment depicted in FIG. 3, the assistive robot 100 includes a wheel actuator 128 engaged with the first and second front wheel assembly 120A, 120B, and another wheel actuator 126 engaged with the first and second rear wheel assembly 130A, 130B. For example, the wheel actuator 128 may be coupled to the first linkage arm 124A of the first front wheel assembly 120A and the wheel actuator 128 may also be coupled to the second linkage arm 124B of the second front wheel assembly 120B. Similarly, the wheel actuator 126 may be coupled to the first linkage arm 134A of the first rear wheel assembly 130A and the second linkage arm 134B of the second rear wheel assembly 130B. The wheel actuators 126, 128 may be electric motors, hydraulic pumps, pneumatic pumps, gas springs, coil springs, torsion bars, or the like that facilitate movement of the first and second front wheel assemblies 120A, 120B, and the first and second rear wheel assemblies 130A, 130B with respect to the chassis body 118. For example, the wheel actuators 126, 128, upon actuation, may move the first and second front wheels 122A, 122B and the first and second rear wheels 132A, 132B upward and downward with respect to the chassis body 118 in the vertical direction, as described above. The wheel actuators 126, 128, upon actuation, may also cause the first and second front wheels 122A, 122B and the first and second rear wheels 132A, 132B to rotate such that the assistive robot 100 may move along a surface such as a floor. In some embodiments, separate actuators may cause the first and second front wheels 122A, 122B and the first and second rear wheels 132A, 132B to rotate. While the embodiment depicted in FIG. 3 the assistive robot 100 includes two wheel actuators 126, 128, it should be understood that the assistive robot 100 may include a single actuator or any suitable number of actuators to facilitate movement of the of the first and second front wheel assemblies 120A, 120B, and the first and second rear wheel assemblies 130A, 130B. Furthermore, it should be understood that while the wheel actuator 126 is engaged with the first and second rear wheel assemblies 130A, 130B, the wheel actuator 126 may actuate the first rear wheel assembly 130A and the second rear wheel assembly 130B independently of one another. Likewise, while the wheel actuator 128 is engaged with the first and second front wheel assemblies 120A, 120B, the wheel actuator 126 may actuate the first front wheel assembly 120A and the second front wheel assembly 120B independently of one another.

Figure 4A:
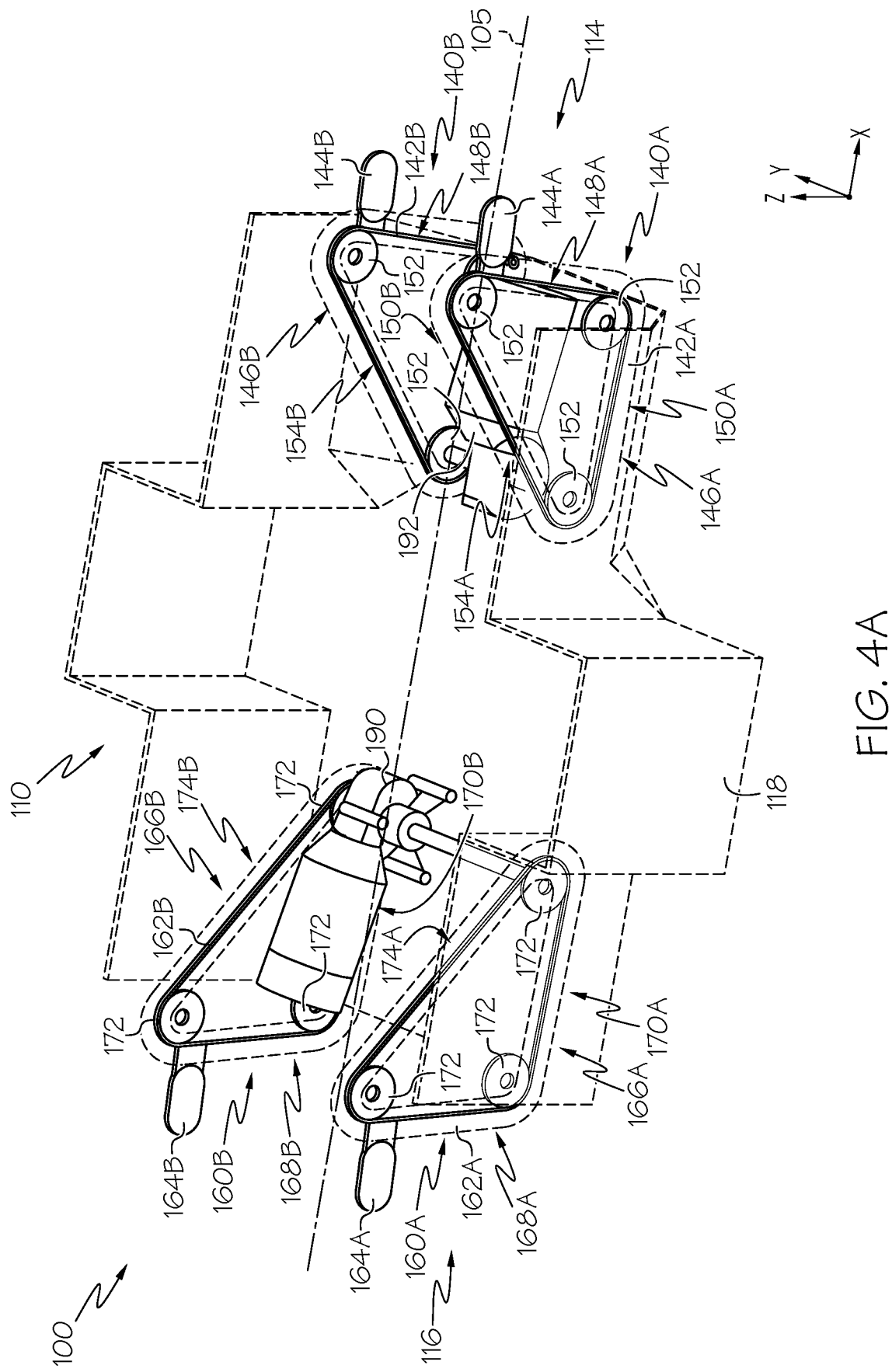
FIG. 4A schematically depicts a perspective view of conveyor assemblies of the assistive robot of FIG. 1 in isolation, according to one or more embodiments shown and described herein.

Referring to FIG. 4A, the first and second front conveyor assemblies 140A, 140B and the first and second rear conveyor assemblies 160A, 160B are shown in isolation. In the embodiment depicted in FIG. 4A, the first and second front conveyor assemblies 140A, 140B, are spaced apart from one another in the lateral direction and are substantially the same. Similarly, the first and second rear conveyor assemblies 160A, 160B are spaced apart from one another in the lateral direction and are substantially the same. In the embodiment depicted in FIG. 4A, the first and second front conveyor assemblies 140A, 140B are equidistant from an assistive robot centerline 105 that bisects the assistive robot 100 in the lateral direction. Similarly, the first and second rear conveyor assemblies 160A, 160B are equidistant from the assistive robot centerline 105, such that the assistive robot 100 is generally symmetric about the assistive robot centerline 105.

Each of the first and second front conveyor assemblies 140A, 140B generally include a first and second front conveyor 142A, 142B, respectively, and first and second front toes 144A, 144B that are coupled to or integral with, and extend outward from the first and second front conveyors 142A, 142B, respectively. In embodiments, the first and second front toes 144A, 144B may include a rigid structure. In some embodiments, one or both of the first and second front toes 144A, 144B may include a wheel or caster 145A (FIG. 6BB) that is configured to rotate. Furthermore, while each of the first and second front conveyor assemblies 140A, 140B include a single first and second front toe 144A, 144B, respectively, it should be understood that each of the first and second front conveyor assemblies 140A, 140B may include any suitable number of toes.

In embodiments, the first and second front conveyors 142A, 142B each define a first and second front conveyor pathway 146A, 146B, respectively along which the first and second front conveyors 142A, 142B move. For example, each of the first and second front conveyors 142A, 142B extend between rotating members 152 that each rotate with respect to the chassis body 118 about the lateral direction. As the rotating members 152 rotate, the rotating members 152 cause the first and second front conveyors 142A, 142B to move (e.g., in a clockwise direction around the rotating members 152 or in a counter-clockwise direction around the rotating members 152). In the embodiment depicted in FIG. 4A, the first and second front conveyors 142A, 142B are depicted as belts that extend between the rotating members 152, which generally include rollers engaged with the belts. However, it should be understood that the first and second front conveyors 142A, 142B may include any suitable conveyor, for example and without limitation, a chain, a cable, a polymer belt, a composite belt, a metal belt, or the like, and the rotating members 152 may include any suitable construction to engage the first and second front conveyors 142A, 142B.

The first and second front conveyor pathways 146A, 146B extend at least partially within the chassis body 118. At positions along the first and second front conveyor pathways 146A, 146B, the first and second front toes 144A, 144B extend outward from the chassis body 118. More particularly, the first and second front conveyor pathways 146A, 146B each define a first and second longitudinal pathway 150A, 150B, respectively, extending along a bottom surface of and at least partially outside of the chassis body 118 in the longitudinal direction. As the first and second front conveyors 142A, 142B move along their respective first and second front conveyor pathways 146A, 146B, the first and second front toes 144A, 144B generally extend outward from the chassis body 118 as the first and second front toes 144A, 144B move along the first and second longitudinal pathways 150A, 150B, respectively. More particularly, the first and second front toes 144A, 144B extend downward from the chassis body 118 (i.e., in the −Z-direction as depicted) when the first and second front toes 144A, 144B pass along the first and second longitudinal pathways 150A, 150B, respectively. In embodiments, the first and second front toes 144A, 144B may extend further outward from the chassis body 118 than the first and second front wheels 122A, 122B (FIG. 2) as the first and second front toes 144A, 144B move along the first and second longitudinal pathways 150A, 150B. More particularly, the first and second front wheels 122A, 122B (FIG. 2) may be retracted toward the chassis body 118 such that the first and second front toes 144A, 144B may extend further outward from the chassis body 118 than the first and second front wheels 122A, 122B (FIG. 2). In this way, the first and second front toes 144A, 144B may engage a surface positioned below the chassis body 118, while the first and second front wheels 122A, 122B (FIG. 2) are spaced apart from the surface, and the first and second front toes 144A, 144B may move the assistive robot 100 along the surface or may act as a parking brake to prevent movement of the assistive robot 100 along the surface.

In the embodiment depicted in FIG. 4A, the first and second front conveyor pathways 146A, 146B define a first and second vertical pathway 148A, 148B, respectively positioned at the front end 114 of the base 110. The first and second vertical pathways 148A, 148B generally extend along a front surface of and at least partially outside of the chassis body 118 in the vertical direction. As the first and second front conveyors 142A, 142B move along their respective first and second front conveyor pathways 146A, 146B, the first and second front toes 144A, 144B generally extend outward from the chassis body 118 as the first and second front toes 144A, 144B move along the first and second vertical pathways 148A, 148B, respectively. More particularly, the first and second front toes 144A, 144B extend forward from the chassis body 118 (i.e., in the +X-direction as depicted) when the first and second front toes 144A, 144B pass along the first and second longitudinal pathways 150A, 150B, respectively.

The first and second front conveyor pathways 146A, 146B, in the embodiment depicted in FIG. 4A, each define a first and second return pathway 154A, 154B, respectively. The first and second return pathways 154A, 154B each extend within the chassis body 118 between the first and second vertical pathways 148A, 148B and the first and second longitudinal pathways 150A, 150B, respectively. As the first and second front conveyors 142A, 142B move along their respective first and second front conveyor pathways 146A, 146B, the first and second front toes 144A, 144B generally extend inward into the chassis body 118 as the first and second front toes 144A, 144B move along the first and second return pathways 154A, 154B, respectively. In some embodiments, the first and second front toes 144A, 144B may be positioned in the first and second return pathways 154A, 154B in a "home" position, for example, when the first and second front toes 144A, 144B are not being utilized to accommodate an obstacle. The home position may include a sensor, such as a limit switch or the like.

The first and second rear conveyor assemblies 160A, 160B generally include a first and second rear conveyor 162A, 162B, respectively and first and second rear toes 164A, 164B that are coupled or integral with, and extend outward from the first and second rear conveyors 162A, 162B, respectively. In embodiments, the first and second rear toes 164A, 164B may include a rigid structure. In some embodiments, one or both of the first and second rear toes 164A, 164B may include a wheel or caster that is configured to rotate. Furthermore, while each of the first and second rear conveyor assemblies 160A, 160B include a single first and second rear toe 164A, 164B, respectively, it should be understood that each of the first and second rear conveyor assemblies 160A, 160B may include any suitable number of toes.

In embodiments, the first and second rear conveyors 162A, 162B each define a first and second rear conveyor pathway 166A, 166B, respectively along which the first and second rear conveyors 162A, 162B move. For example, each of the first and second rear conveyors 162A, 162B extend between rotating members 172 that each rotate with respect to the chassis body 118 about the lateral direction. As the rotating members 172 rotate, the rotating members 172 cause the first and second rear conveyors 162A, 162B to move (e.g., in a clockwise direction around the rotating members 172 or in a counter-clockwise direction around the rotating members 172). In the embodiment depicted in FIG. 4A, the first and second rear conveyors 162A, 162B are depicted as belts that extend between the rotating members 152, which generally include rollers engaged with the belts. However, it should be understood that the first and second rear conveyors 162A, 162B may include any suitable conveyor, for example and without limitation, a chain, a cable, a polymer belt, a composite belt, a metal belt, or the like, and the rotating members 172 may include any suitable construction to engage the first and second front conveyors 142A, 142B.

The first and second rear conveyor pathways 166A, 166B extend at least partially within the chassis body 118. At positions along the first and second rear conveyor pathways 166A, 166B, the first and second rear toes 164A, 164B extend outward from the chassis body 118. More particularly, the first and second rear conveyor pathways 166A, 166B each define a first and second longitudinal pathway 170A, 170B extending along a bottom surface of and at least partially outside of the chassis body 118 in the longitudinal direction. As the first and second rear conveyors 162A, 162B move along their respective first and second rear conveyor pathways 166A, 166B, the first and second rear toes 164A, 164B generally extend outward from the chassis body 118 as the first and second rear toes 164A, 164B move along the first and second longitudinal pathways 170A, 170B, respectively. More particularly, the first and second rear toes 164A, 164B extend downward from the chassis body 118 (i.e., in the −Z-direction as depicted) when the first and second rear toes 164A, 164B pass along the first and second longitudinal pathways 170A, 170B, respectively. In embodiments, the first and second rear toes 164A, 164B may extend further outward from the chassis body 118 than the first and second rear wheels 132A, 132B (FIG. 2) as the first and second rear toes 164A, 164B move along the first and second longitudinal pathways 170A, 170B. More particularly, the first and second rear wheels 132A, 132B (FIG. 2) may be retracted toward the chassis body 118 such that the first and second rear toes 164A, 164B may extend further outward from the chassis body 118 than the first and second rear wheels 132A, 132B (FIG. 2). In this way, the first and second rear toes 164A, 164B may engage a surface positioned below the chassis body 118, while the first and second rear wheels 132A, 132B are spaced apart from the surface, and the first and second rear toes 164A, 164B may move the assistive robot 100 along the surface or may act as a parking brake to prevent movement of the assistive robot 100 along the surface.

In the embodiment depicted in FIG. 4A, each of the first and second rear conveyor pathways 166A, 166B define first and second vertical pathways 168A, 168B, respectively positioned at the rear end 116 of the base 110. The first and second vertical pathways 168A, 168B generally extend along a rear surface of and at least partially outside of the chassis body 118 in the vertical direction. As the first and second rear conveyors 162A, 162B move along their respective first and second rear conveyor pathways 166A, 166B, the first and second rear toes 164A, 164B generally extend outward from the chassis body 118 as the first and second rear toes 164A, 164B move along the first and second vertical pathways 168A, 168B, respectively. More particularly, the first and second rear toes 164A, 164B extend rearward from the chassis body 118 (i.e., in the −X-direction as depicted) when the first and second rear toes 164A, 164B pass along the first and second longitudinal pathways 170A, 170B, respectively.

The first and second rear conveyor pathways 166A, 166B, in the embodiment depicted in FIG. 4A, each define a first and second return pathway 174A, 174B, respectively. The first and second return pathways 174A, 174B each extend within the chassis body 118 between the first and second vertical pathways 168A, 168B and the first and second longitudinal pathways 170A, 170B, respectively. As the first and second rear conveyors 162A, 162B move along their respective first and second rear conveyor pathways 166A, 166B, the first and second rear toes 164A, 164B generally extend inward into the chassis body 118 as the first and second rear toes 164A, 164B move along the first and second return pathways 174A, 174B, respectively. In some embodiments, the first and second rear toes 164A, 164B may be positioned in the first and second return pathways 174A, 174B in a "home" position, for example, when the first and second rear toes 164A, 164B are not being utilized to accommodate an obstacle. The home position may include a sensor, such as a limit switch or the like.

The assistive robot 100, in embodiments, further includes at least one actuator that moves the first and second front conveyors 142A, 142B and the first and second rear conveyors 162A, 162B. In the embodiment depicted in FIG. 4A, the assistive robot 100 includes a rear conveyor actuator 190 engaged with the first and second rear conveyors 162A, 162B and a front conveyor actuator 192 engaged with the first and second front conveyors 142A, 142B. More particularly, the rear conveyor actuator 190 is coupled to a rotating member 172 engaged with the first rear conveyor 162A and a rotating member 172 engaged with the second rear conveyor 162B. The rear conveyor actuator 190 may rotate the rotating members 172 to move the first and second rear conveyors 162A, 162B. Similarly, the front conveyor actuator 192 is coupled to a rotating member 152 engaged with the first front conveyor 142A, and is coupled to a rotating member 152 engaged with the second front conveyor 142B. The front conveyor actuator 192 may rotate the rotating members 152 to move the first and second front conveyors 142A, 142B. In embodiments, the front conveyor actuator 192 and the rear conveyor actuator 190 may include any suitable mechanism for moving the first and second front conveyors 142A, 142B and the first and second rear conveyors 162A, 162B, and may include electric motors, hydraulic pumps, pneumatic pumps, or the like. By moving the first and second front conveyors 142A, 142B and the first and second rear conveyors 162A, 162B, and accordingly the first and second front toes 144A, 144B and the first and second rear toes 164A, 164B, the assistive robot 100 may ascend onto and descend from an obstacle, such as a step, as described in greater detail herein. While in the embodiment depicted in FIG. 4A, the assistive robot 100 includes the front conveyor actuator 192 engaged with the first and second front conveyors 142A, 142B, it should be understood that the front conveyor actuator 192 may move the first and second front conveyors 142A, 142B independently of one another. Likewise, while in the embodiment depicted in FIG. 4A, the assistive robot 100 includes the rear conveyor actuator 190 engaged with the first and second rear conveyors 162A, 162B, it should be understood that the rear conveyor actuator 190 may move the first and second rear conveyors 162A, 162B independently of one another.

In the embodiment depicted in FIG. 4A, the assistive robot 100 includes the first and second front conveyors 142A, 142B including the first and second front toes 144A, 144B and the assistive robot 100 includes the first and second rear conveyors 162A, 162B including the first and second rear toes 164A, 164B; however, it should be understood that the assistive robot 100 may include any suitable number of front conveyors and front toes and any suitable number of rear conveyors and rear toes. For example, in some embodiments, the assistive robot 100 may include a single front toe extending between the first and second front conveyors 142A, 142B in the lateral direction, and/or may include a single rear toe extending between the first and second rear conveyors 162A, 162B. In some embodiments, the assistive robot 100 may include a single front conveyor with a single front toe and/or a single rear conveyor with a single rear toe. In these embodiments, the single front toe and/or the single rear toe extends in the lateral direction by a distance sufficient to support the assistive robot 100 on a surface without the assistive robot 100 rotating about the longitudinal direction. Furthermore, in some embodiments, the first front and rear conveyors 142A, 162A, may be interconnected to form a single conveyor extending the length of the assistive robot 100 in the longitudinal direction, and the second front and rear conveyors 142A, 162A may in interconnected to form a single conveyor extending the length of the assistive robot 100 in the longitudinal direction. In these embodiments, the first front and rear conveyors and the second front and rear conveyors may each form longitudinal pathways extending along the length of the assistive robot 100, and may each form return pathways extending along the length of the assistive robot 100 within the base 110.

Figure 4B:
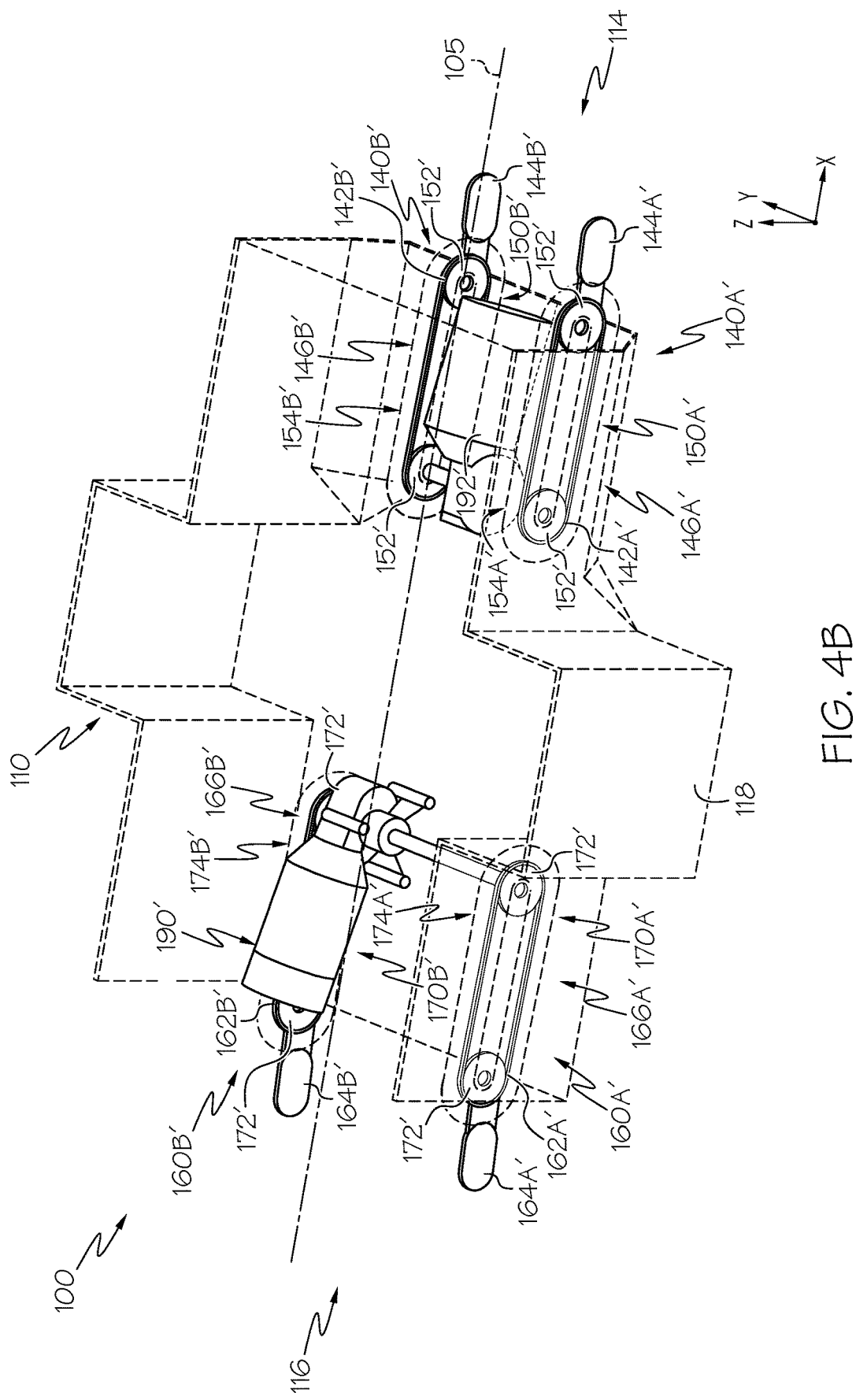
FIG. 4B schematically depicts a perspective view of conveyor assemblies of the assistive robot of FIG. 1 in isolation, according to one or more embodiments shown and described herein.

Referring to FIG. 4B, a perspective view of another embodiment of the first and second front conveyor assemblies 140A', 140B' and the first and second rear conveyor assemblies 160A', 160B' is schematically depicted. In the embodiment depicted in FIG. 4B, the first and second front conveyors 142A', 142B' define the first and second front conveyor pathways 146A', 146B' including the first and second longitudinal pathways 150A', 150B', respectively, and the first and second return pathways 154A', 154B', respectively. Similarly, the first and second rear conveyors 162A', 162B' define the first and second rear conveyor pathways 166A', 166B' including the first and second longitudinal pathways 170A', 170B', respectively, and the first and second return pathways 174A', 174B'. However, in the embodiment depicted in FIG. 4B, the first and second front conveyor pathways 146A', 146B' do not include the first and second vertical pathways 148A, 148B (FIG. 4A), respectively. Instead, the first and second front conveyor pathways 146A', 146B' may only extend a minimal distance in the vertical direction, for example, a span of the rotating members 152'. Similarly, in the embodiment depicted in FIG. 4B, the first and second rear conveyor pathways 166A', 166B' do not include the first and second vertical pathways 168A, 168B (FIG. 4A). Instead, the first and second rear conveyor pathways 166A', 166B' may only extend a minimal distance in the vertical direction, for example, a span of the rotating members 172'. In embodiments in which the first and second front conveyor pathways 146A', 146B' and/or the first and second rear conveyor pathways 166A', 166B' lack a vertical pathway, the assistive robot may be lifted or lowered in the vertical direction through coordinated movement of first and second front wheel assemblies 120A, 120B, (FIG. 2) and the first and second rear wheel assemblies 130A, 130B (FIG. 2), as described in greater detail herein.

While in the embodiment depicted in FIG. 4B, the first and second front conveyor assemblies 140A', 140B' and the first and second rear conveyor assemblies 160A', 160B' do not include the first and second vertical pathways 148A, 148B (FIG. 4A) and the first and second vertical pathways 168A, 168B (FIG. 4A), it should be understood that other embodiments are contemplated. For example and referring to both FIGS. 4A and 4B, in some embodiments, the assistive robot 100 may include the first and second front conveyor assemblies 140A, 140B having the first and second vertical pathways 148A, 148B, while including the first and second rear conveyor assemblies 160A', 160B' that do not have vertical pathways. Similarly, in some embodiments, the assistive robot 100 may include the first and second front conveyor assemblies 140A', 140B' that do not have vertical pathways, while including the first and second rear conveyor assemblies 160A, 160B having the first and second vertical pathways 168A, 168B.

Figure 5:
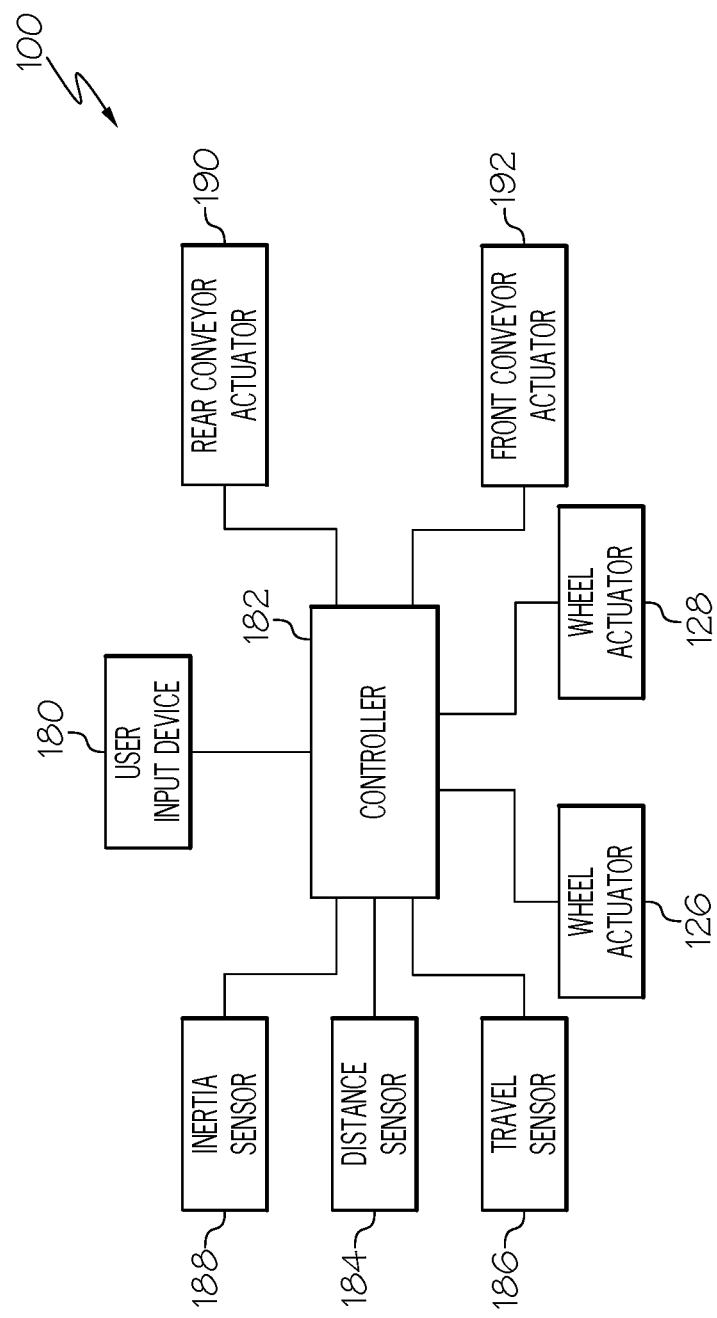
FIG. 5 schematically depicts a control diagram of the assistive robot of FIG. 1, according to one or more embodiments shown and described herein.

Referring to FIG. 5, a control diagram of the assistive robot 100 is schematically depicted. In embodiments, the assistive robot 100 includes a controller 182, which, in embodiments, includes one or more processors, such as a computer processing unit (CPU), which may include any processing component configured to receive and execute instructions. The controller 182 may further include a memory component configured as a volatile and/or a non-volatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component of the controller 182 may include non-transitory computer-readable medium containing one or more computer readable and executable instruction sets, which when executed, causes the processor to complete the various processes described herein.

The assistive robot 100, in embodiments, may include a user input device 180 that is configured to receive a user input. The user input device 180 may include any suitable device for receiving a user input, for example and without limitation a graphical user interface (GUI), one or more push-buttons, a joystick, or the like. The user input device 180, is communicatively coupled to the controller 182, such that a user may input commands to control the operation of the assistive robot 100. In some embodiments, the operation of the assistive robot 100 may be controlled via user input received by the user input device 180. In some embodiments, the operation of the assistive robot 100 may be semi-autonomous or fully-autonomous.

The controller 182 is also communicatively coupled to the wheel actuators 126, 128, and the front conveyor actuator 192 and the rear conveyor actuator 190. In embodiments, the controller 182 may direct the wheel actuators 126, 128 to actuate, thereby moving the first and second front wheel assemblies 120A, 120B (FIG. 2) and/or the first and second rear wheel assemblies 130A, 130B (FIG. 2). The controller 182 may similarly direct the front conveyor actuator 192 to actuate, thereby moving the first and second front conveyors 142A, 142B (FIGS. 4A, 4B) to move along their respective first and second front conveyor pathways 146A, 146B (FIGS. 4A, 4B). In embodiments, the controller 182 may direct the rear conveyor actuator 190 to actuate, thereby moving the first and second rear conveyors 162A, 162B (FIGS. 4A, 4B) to move along their respective first and second rear conveyor pathways 166A, 166B (FIGS. 4A, 4B).

In embodiments, the assistive robot 100 further includes an distance sensor 184 communicatively coupled to the controller 182. Through the controller 182, the distance sensor 184 is communicatively coupled to the front and rear conveyor actuators 190, 192 and the wheel actuators 126, 128. The distance sensor 184 is configured to detect the height and position of obstacles positioned around the assistive robot 100. For example, the distance sensor 184 may include a radio detection and ranging (RADAR) sensor, a light detection and ranging (LIDAR) sensor, a laser sensor, a camera, a bump sensor, a limit switch, or the like positioned on the assistive robot 100 to detect the height and/or position of objects (e.g., obstacles) positioned around the assistive robot 100.

In some embodiments, the assistive robot 100 includes a travel sensor 186 communicatively coupled to the controller 182. The travel sensor 186 may detect a distance travelled by the assistive robot 100 along a surface. For example, the travel sensor 186 may include an encoder or the like positioned on any of the first and second front wheels 122A, 122B (FIG. 3) or the first and second rear wheels 132A, 132B (FIG. 3).

In the embodiment depicted in FIG. 5, the assistive robot 100 further includes an inertia sensor 188 communicatively coupled to the controller 182. The inertia sensor 188 includes a sensor configured to detect force applied to the assistive robot 100 and/or the orientation of the assistive robot 100. In embodiments, the inertia sensor 188 may include any suitable device or combination of devices, for example and without limitation, an accelerometer, a gyroscope, or the like. The inertia sensor 188 may detect an orientation of the assistive robot 100 with respect to a reference orientation (e.g., the X-Y plane as depicted in FIG. 1). In operation, it is desirable for the assistive robot 100 to maintain a generally level orientation, such that items held by the assistive robot 100 (e.g., within the bins 10, 12 as depicted in FIG. 1) are not disturbed as the assistive robot 100 moves.

In embodiments, when the inertia sensor 188 detects that orientation of the assistive robot 100 evaluated with respect to the reference orientation (e.g., the X-Y plane as depicted in FIG. 1) exceeds a predetermined threshold, the controller 182 may direct the wheel actuators 126, 128 and/or the front and rear conveyor actuators 192, 190 to actuate to change the orientation of the assistive robot 100. For example, the controller 182 may direct the wheel actuators 126, 128 to move the first and second front wheel assemblies 120A, 120B (FIG. 2) and/or the first and second rear wheel assemblies 130A, 130B (FIG. 2) to change the orientation of the assistive robot 100 until the orientation of the assistive robot 100 is within the predetermined threshold. Likewise, the controller 182 may direct the front and rear conveyor actuators 192, 190 to move the first and second front conveyor assemblies 140A, 140B (FIG. 2) and/or the first and second rear conveyor assemblies 160A, 160B (FIG. 2) to change the orientation of the assistive robot 100 until the orientation of the assistive robot 100 is within the predetermined threshold. In embodiments, the predetermined threshold may be 10 degrees evaluated from the reference orientation (e.g., a 10 degree deviation from the X-Y plane as depicted in FIG. 1). In some embodiments the predetermined threshold may be 5 degrees evaluated from the reference orientation (e.g., a 5 degree deviation from the X-Y plane as depicted in FIG. 1). In this way, the assistive robot 100 may actively detect and adjust the orientation of the assistive robot 100 to maintain a generally level orientation.

Reference will now be made herein to the operation of the first and second front conveyor assemblies 140A, 140B (FIGS. 4A, 4B) and the first and second rear conveyor assemblies 160A, 160B (FIGS. 4A, 4B) in moving the assistive robot 100 upward onto an obstacle (e.g., a step) and moving the assistive robot 100 downward from an obstacle. Through coordinated movement of the first and second front conveyor assemblies 140A, 140B (FIGS. 4A, 4B) and the first and second rear conveyor assemblies 160A, 160B (FIGS. 4A, 4B), the assistive robot 100 may selectively move the first and second front wheel assemblies 120A, 120B (FIG. 2) and the first and second rear wheel assemblies 130A, 130B (FIG. 2) upward onto, and downward from an obstacle, while maintaining contact with the obstacle such that the assistive robot 100 may be maintained in a stable and substantially level orientation.

Figures 6A, 6B:
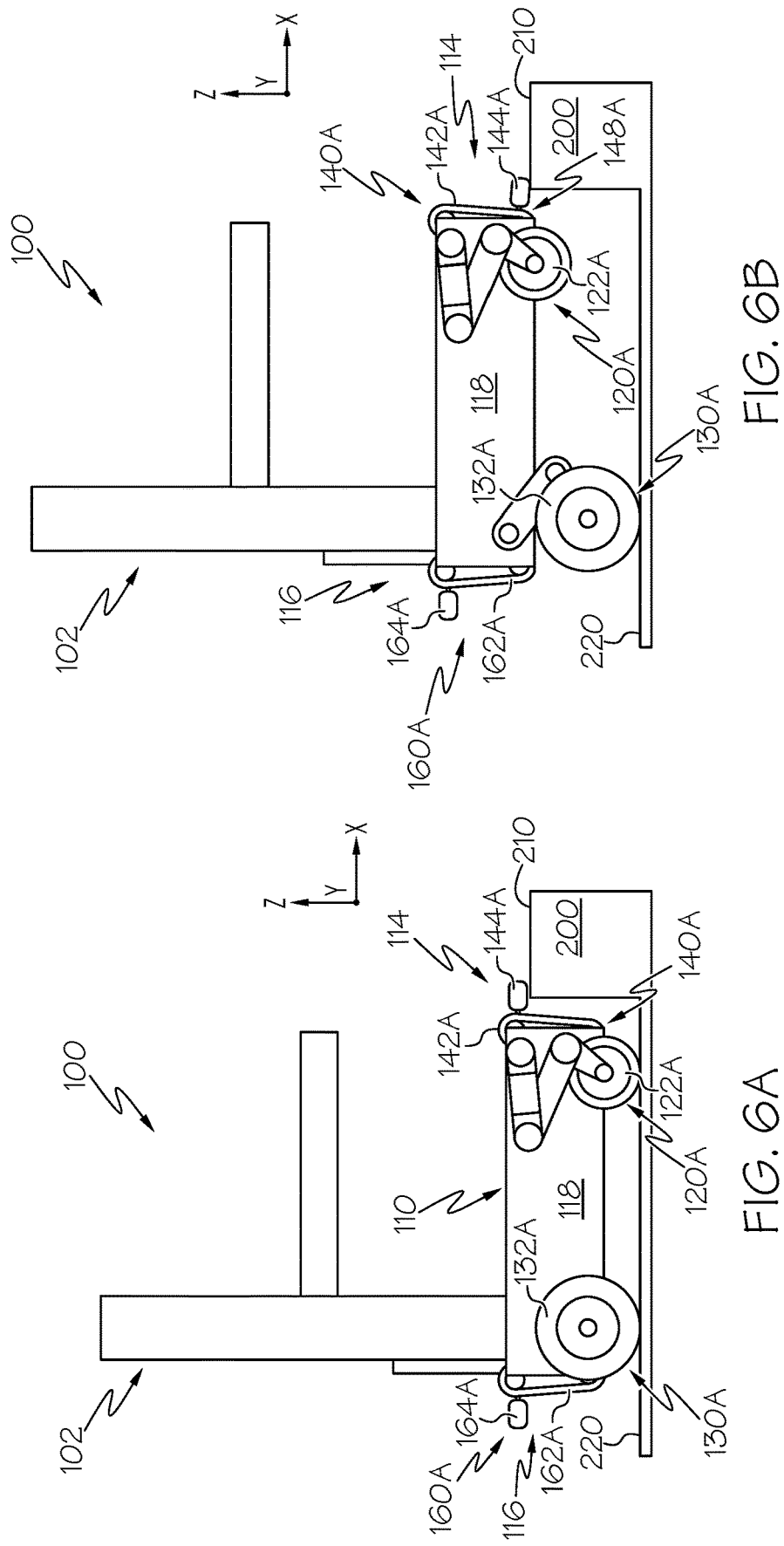
FIG. 6A schematically depicts a side view of the assistive robot of FIG. 1 engaging an obstacle with a front toe of the assistive robot, according to one or more embodiments shown and described herein.
FIG. 6B schematically depicts a side view of the assistive robot of FIG. 1 moving upward in the vertical direction with respect to the obstacle, according to one or more embodiments shown and described herein, according to one or more embodiments shown and described herein.

Referring initially to FIGS. 5 and 6A, the assistive robot 100 is depicted approaching an obstacle 200. While the side view of the assistive robot 100 depicted in FIG. 6A shows, and reference is made herein to the first front and rear conveyor assemblies 140A, 160B and the first front and rear wheel assemblies 120A, 130B, it should be understood that the second front and rear conveyor assemblies 140B, 160B (FIGS. 4A, 4B) and the second front and rear wheel assemblies 120B, 130B (FIG. 3) act in concert with and in the same manner as the first front and rear conveyor assemblies 140A, 160B and the first front and rear wheel assemblies 120A, 130B, respectively. In some embodiments, the first front and rear conveyor assemblies 140A, 160B and the first front and rear wheel assemblies 120A, 130B, may operate independently and in coordination with the second front and rear conveyor assemblies 140B, 160B (FIGS. 4A, 4B) and the second front and rear wheel assemblies 120B, 130B (FIG. 3), for example such that the assistive robot 100 may accommodate obstacles that are uneven in the longitudinal direction (i.e., in the X-direction as depicted).

The obstacle 200 may be a step or curb, as may be positioned outside of a shopping environment, a home, or the like. When approaching a location having an obstacle 200, the assistive robot 100 may initially be positioned on a surface 220 that is positioned below the obstacle 200, and may approach the obstacle 200 in the longitudinal direction. In some embodiments, the assistive robot 100 may detect the presence of the obstacle 200 via current applied to the wheel actuators 126, 128. For example, as the assistive robot 100 approaches and the front end 114 of the base 110 engages the obstacle 200, the obstacle 200 may restrict further forward movement of the assistive robot 100 in the longitudinal direction (i.e., in the +X-direction). The restriction of movement of the assistive robot 100 due to the engagement with the obstacle 200 may cause an increase of current drawn by the wheel actuators 126, 128 (e.g., in embodiments in which the wheel actuators 126, 128 include electric motors).

In embodiments including the distance sensor 184, the distance sensor 184 may detect the presence and orientation of the obstacle 200 with respect to the assistive robot 100. In response to detecting the presence and orientation of the obstacle 200, the controller 182 may direct the wheel actuators 126, 128 to move the first front and rear wheel assemblies 120A, 130A and the second front and rear wheel assemblies 120B, 130B (FIG. 2) to align the first front wheel 122A and the second front wheel 122B with the obstacle 200, as depicted in FIG. 6A. Upon detecting the position and orientation the obstacle 200, the controller 182 directs the first front conveyor assembly 140A to move the first front conveyor 142A in a clockwise direction until the first front toe 144A engages an obstacle surface 210 of the obstacle 200, as an example. The assistive robot 100, in embodiments, may detect engagement of the first front toe 144A with the obstacle surface 210 by detecting a resistance, e.g., an increase in current drawn by the front conveyor actuator 192.

Referring to FIGS. 5 and 6B, the assistive robot 100 is depicted with the first front toe 144A engaged with the obstacle 200. While obscured by the side view shown in FIG. 6B, it should be understood that the second front toe 144B (FIG. 4A) similarly engages the obstacle in concert with the first front toe 144A. The controller 182 directs the first front conveyor assembly 140A to move the first front conveyor 142A in the clockwise direction, such that the first front toe 144A moves along the first vertical pathway 148A. As the first front toe 144A moves along the first vertical pathway 148A, the downward movement of the first front toe 144A causes the chassis body 118 to move upward in the vertical direction. The controller 182 may direct the first rear wheel assembly 130A to simultaneously move the first rear wheel 132A downward and away from the chassis body 118 (i.e., from the retracted position to the extended position), such that the chassis body 118 moves upward in the vertical direction. Movement of the first rear wheel assembly 130A may be coordinated with the movement of the first front toe 144A, such that the chassis body 118 remains generally level (i.e., in the X-Y plane as depicted).

While in the embodiment depicted in FIGS. 6A and 6B, the first front conveyor assembly 140A elevates the chassis body 118 by engaging the first front toe 144A with the obstacle 200, in other embodiments, the chassis body 118 may be elevated through coordinated movement for the first front wheel assembly 120A and the first rear wheel assembly 130A. For example, as depicted in FIG. 6BB, in embodiments in which the first front conveyor assembly 140A does not include the first vertical pathway 148A, upon detecting the presence of the obstacle 200, the first front wheel assembly 120A may move the first front wheel 122A downward and away from the chassis body 118 (i.e., from the retracted position to the extended position) in coordination with the first rear wheel assembly 130A moving the first rear wheel 132A downward and away from the chassis body 118 (i.e., from the retracted position to the extended position). Once the chassis body 118 is positioned above the obstacle 200 in the vertical direction, the first front toe 144A may be engaged with the obstacle 200 as shown in FIG. 6C.

Figure 6C:
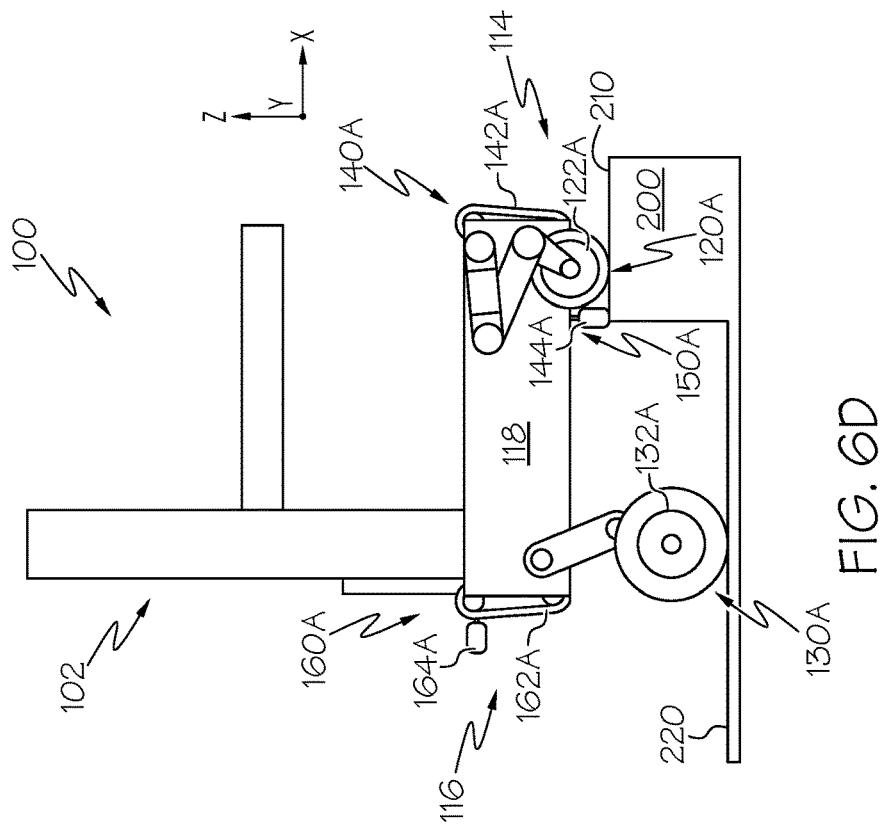
FIG. 6C schematically depicts a side view of the front toe of the assistive robot of FIG. 1 engaged with the obstacle and moving in a longitudinal direction, according to one or more embodiments shown and described herein.
Figure 6D:
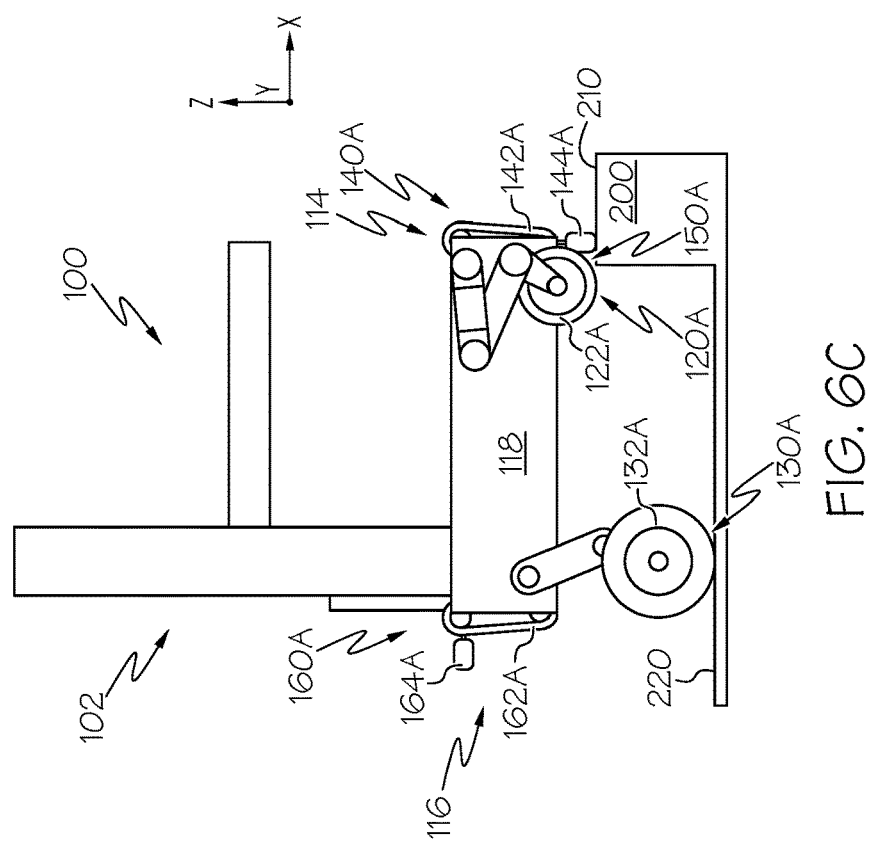
FIG. 6D schematically depicts a side view of a front wheel of the assistive robot of FIG. 1 positioned on the obstacle, according to one or more embodiments shown and described herein.

Referring to FIGS. 5, 6C and 6D, as the first front toe 144A continues to move in the clockwise direction, the first front toe 144A moves along the first longitudinal pathway 150A while engaged with the obstacle 200. As the first front toe 144A moves along the first longitudinal pathway 150A, the controller 182 may direct the first rear wheel 132A to rotate. Through the rotation of the first rear wheel 132A and the movement of the first front toe 144A along the first longitudinal pathway 150A, the chassis body 118 moves forward in the longitudinal direction (i.e., in the +X-direction as depicted). As the chassis body 118 moves forward in the longitudinal direction, the first front wheel 122A may engage the obstacle surface 210, such that the assistive robot 100 is supported by the first front wheel 122A on the obstacle surface 210 and the first rear wheel 132A on a surface 220 below the obstacle 200.

Referring to FIGS. 5 and 6E, with the first front wheel 122A on the obstacle surface 210 and the first rear wheel 132A positioned on the surface 220 below the obstacle 200, the controller 182 may direct the first front wheel 122A and the first rear wheel 132A to rotate, moving the assistive robot 100 forward in the longitudinal direction (i.e., in the +X-direction as depicted). When the first longitudinal pathway 170A of the first rear conveyor assembly 160A is positioned over the obstacle surface 210, the controller 182 may direct the first rear conveyor 162A to rotate such that the first rear toe 164A engages the obstacle surface 210. In embodiments, the assistive robot 100 may detect that the first longitudinal pathway 170A of the first rear conveyor assembly 160A is positioned over the obstacle surface 210 in a variety of manners. For example, in some embodiments, the assistive robot 100 may detect that the first rear conveyor assembly 160A is positioned over the obstacle surface 210 with the travel sensor 186. The travel sensor 186 may detect a distance travelled by the assistive robot 100 onto the obstacle 200, for example, the distance travelled by the assistive robot 100 in the longitudinal direction evaluated from the initial engagement of the first front toe 164A with the obstacle 200 (e.g., as shown in FIG. 6A). Once the travel sensor 186 detects that the assistive robot 100 has travelled forward onto the obstacle 200 by a predetermined distance that corresponds to a distance evaluated from the front end 114 of the assistive robot 100 to the first longitudinal pathway 170A of the first rear conveyor assembly 160A, the controller 182 may determine that the first longitudinal pathway 170A is positioned over the obstacle surface 210.

With the first rear toe 164A and the first front wheel 122A engaged with the obstacle surface 210, the assistive robot 100 may be supported on the obstacle 200 by the first rear toe 164A and the first front wheel 122A.

Referring to FIGS. 5 and 6F, with the assistive robot 100 supported on the obstacle 200 by the first rear toe 164A and the first front wheel 122A, the controller 182 may direct the first rear wheel assembly 130A to retract the first rear wheel 132A toward the chassis body 118, moving the first rear wheel 132A upward in the vertical direction (i.e., from the extended position to the retracted position). As the first rear wheel 132A moves upward in the vertical direction, the first rear wheel 132A may move above the obstacle surface 210 in the vertical direction.

Figure 6G:
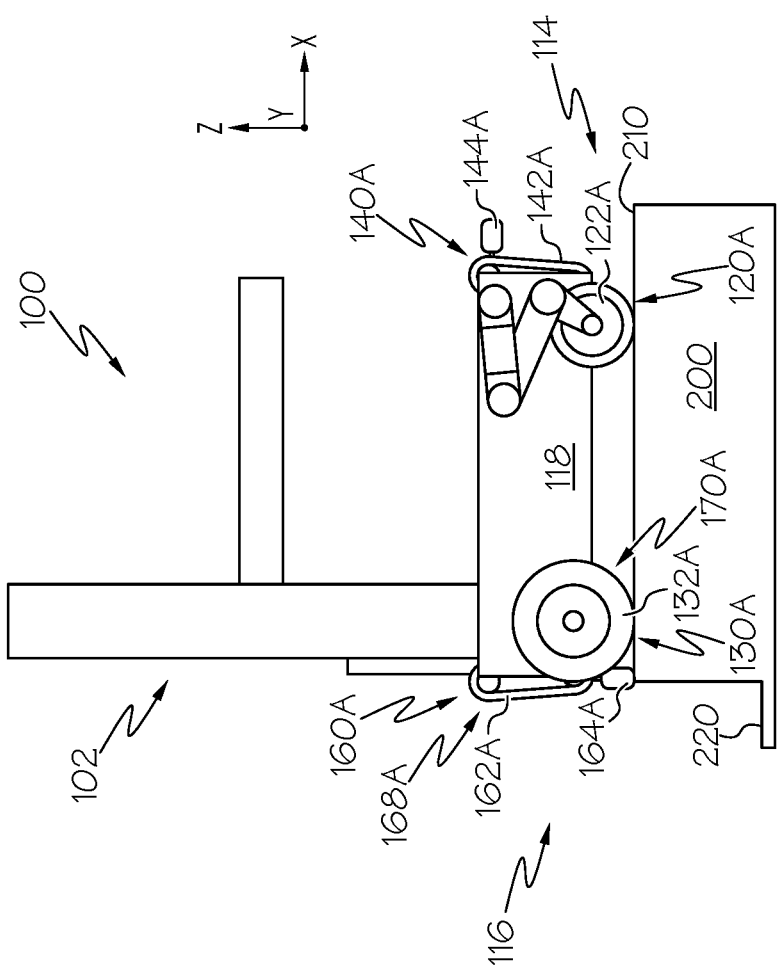
FIG. 6G schematically depicts a side view of a rear wheel of the assistive robot of FIG. 1 positioned on the obstacle, according to one or more embodiments shown and described herein.

Referring to FIGS. 5 and 6G, as the first elevator rear toe 164A moves along the first longitudinal pathway 170A of the first rear conveyor assembly 160A, the controller 182 may direct the first rear wheel assembly 130A to lower the first rear wheel 132A to engage the obstacle surface 210, such that the assistive robot 100 is supported on the obstacle 200 by the first front wheel 122A and the first rear wheel 132A. As the first rear conveyor 162A continues to rotate in the clockwise direction, the first rear toe 164A moves toward the first vertical pathway 168A of the first rear conveyor assembly 160A and disengages the obstacle surface 210 such that the assistive robot 100 is supported on the obstacle surface 210 only by the first front wheel 122A and the first rear wheel 132A.

The conveyor assemblies may also assist in lowering the assistive robot 100 from the obstacle 200, as described below with reference to FIGS. 7A-7G.

Figure 7A:
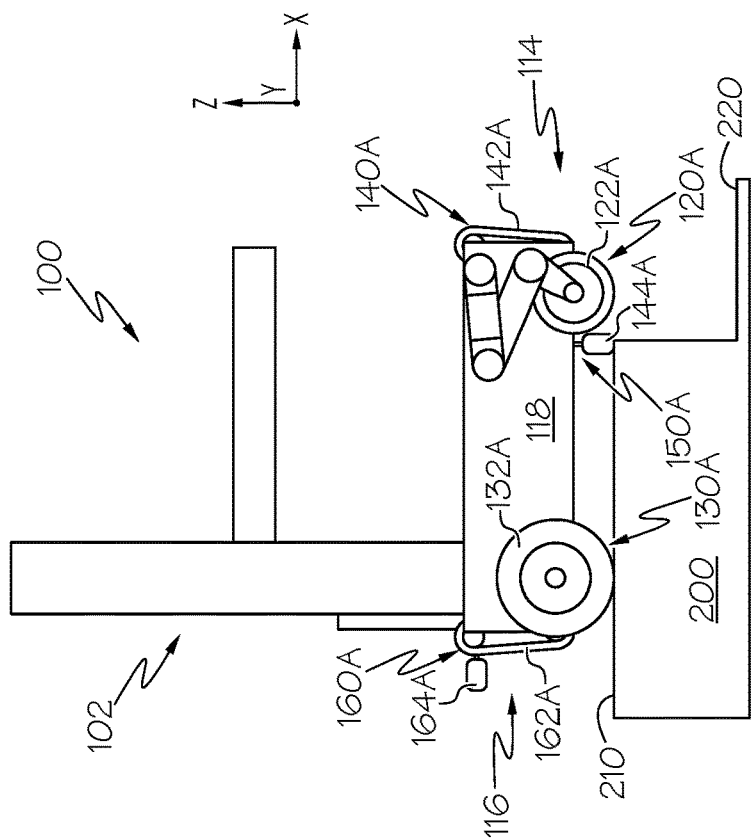
FIG. 7A schematically depicts a side view of the front toe of the assistive robot of FIG. 1 engaged with the obstacle, according to one or more embodiments shown and described herein.

Referring to FIGS. 5 and 7A, the assistive robot 100 is depicted approaching an edge of the obstacle 200. While the side view of the assistive robot 100 depicted in FIG. 7A shows, and reference is made herein to the first front and rear conveyor assemblies 140A, 160B and the first front and rear wheel assemblies 120A, 130B, it should be understood that the second front and rear conveyor assemblies 140B, 160B (FIGS. 4A, 4B) and the second front and rear wheel assemblies 120B, 130B (FIG. 3) act in concert with and in the same manner as (but not necessarily simultaneously with) the first front and rear conveyor assemblies 140A, 160B and the first front and rear wheel assemblies 120A, 130B, respectively.

In embodiments including the distance sensor 184, the distance sensor 184 may detect the presence and orientation of the obstacle 200 with respect to the surface 220 below the obstacle 200. In response to detecting the presence and orientation of the edge of the obstacle 200, the controller 182 may direct the wheel actuators 126, 128 to move the first front and rear wheel assemblies 120A, 130A and the second front and rear wheel assemblies 120B, 130B (FIG. 2) to align the first front wheel 122A and the second front wheel 122B with the edge of the obstacle 200, as depicted in FIG. 7A. Upon detecting the height of the obstacle 200, the controller 182 directs the first front conveyor assembly 140A to move the first front conveyor 142A in a clockwise direction until the first front toe 144A engages the obstacle surface 210.

Figure 7B:
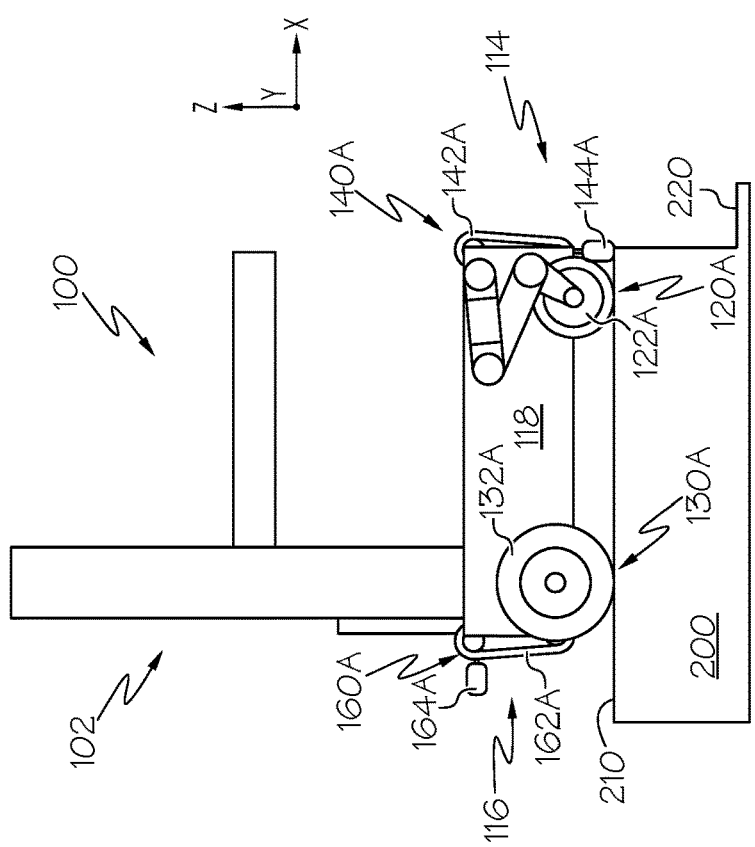
FIG. 7B schematically depicts a side view of the front toe of the assistive robot of FIG. 1 moving rearward in the longitudinal direction to position the front wheel over the edge of the obstacle, according to one or more embodiments shown and described herein.
Figure 7E:
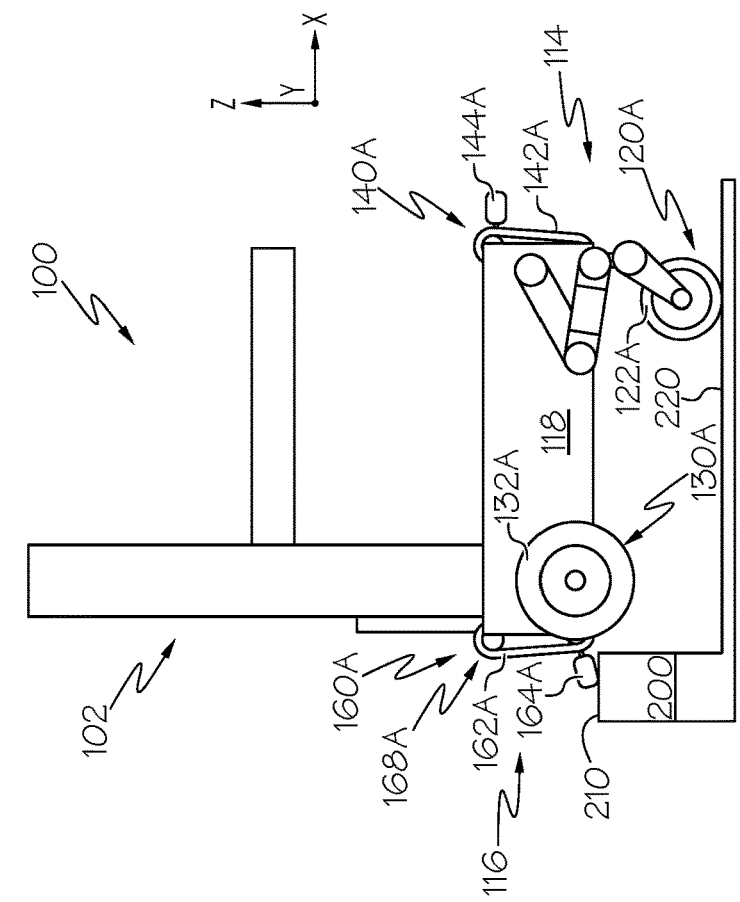
FIG. 7E schematically depicts a side view of the rear toe of the assistive robot of FIG. 1 moving rearward, according to one or more embodiments shown and described herein.
Figure 7F:
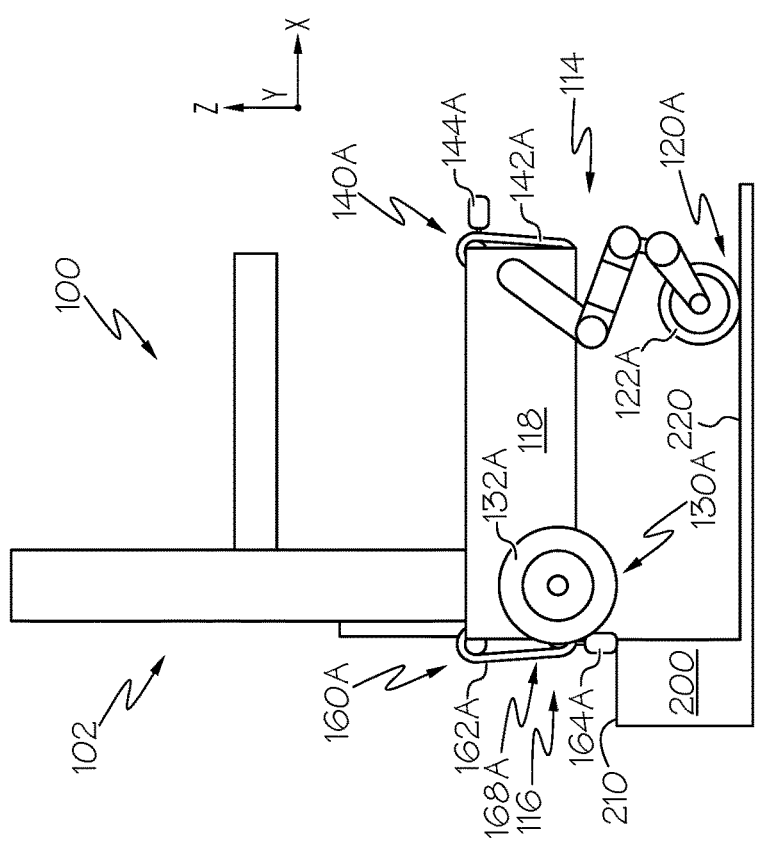
FIG. 7F schematically depicts a side view of the rear wheel of the assistive robot of FIG. 1 positioned over the surface below the obstacle, according to one or more embodiments shown and described herein.

Referring to FIGS. 5, 7B, and 7C, as the first front toe 144A continues to move in the clockwise direction, the first front toe 144A moves along the first longitudinal pathway 150A while engaged with the obstacle 200. As the first front toe 144A moves along the first longitudinal pathway 150A, the controller 182 may direct the first rear wheel 132A to rotate. Through the rotation of the first rear wheel 132A and the movement of the first front toe 144A along the first longitudinal pathway 150A, the chassis body 118 moves forward in the longitudinal direction (i.e., in the +X-direction as depicted). As the chassis body 118 moves forward in the longitudinal direction, the first front wheel 122A moves over the edge of the obstacle 200, such that the first front wheel 122A is positioned over the surface 220 below the obstacle 200. With the first front wheel 122A positioned over the surface 220, the assistive robot 100 is supported on the obstacle 200 by the first rear wheel 132A and the first front toe 144A.

Once the first front wheel 122A is positioned over the surface 220, the controller 182 may direct the wheel actuators 126, 128 to lower the first front wheel 122A (and the second front wheel 122B (FIG. 3)) toward the surface 220 (i.e., from the retracted position to the extended position), as depicted in FIG. 7C. In embodiments, the assistive robot 100 may detect that the first front wheel 122A is positioned over the surface 220 below the obstacle 200 in a variety of manners. For example, in some embodiments, the assistive robot 100 may detect that the first front wheel 122A is positioned over the surface 220 below the obstacle 200 with the travel sensor 186. The travel sensor 186 may detect a distance travelled by the assistive robot 100 over the edge of the obstacle 200, for example, the distance travelled by the assistive robot 100 in the longitudinal direction evaluated from the initial engagement of the first front toe 144A with the obstacle 200 (e.g., as shown in FIG. 7A). Once the travel sensor 186 detects that the assistive robot 100 has travelled forward over the edge of the obstacle 200 by a predetermined distance that corresponds to a distance evaluated from the front end 114 of the assistive robot 100 to the first front wheel 122A, the controller 182 may determine that the first front wheel 122A is positioned over the surface 220 below the obstacle 200.

Referring collectively to FIGS. 5 and 7D, with the first front wheel 122A on the surface 220 below the obstacle 200 and the first rear wheel 132A positioned on the obstacle surface 210, the controller 182 may direct the first front wheel 122A and the first rear wheel 132A to rotate, moving the assistive robot 100 forward in the longitudinal direction (i.e., in the +X-direction as depicted). When the first longitudinal pathway 170A of the first rear conveyor assembly 160A is positioned over the edge of the obstacle 200, the controller 182 may direct the first rear conveyor 162A to rotate such that the first rear toe 164A engages the obstacle surface 210. In embodiments, the assistive robot 100 may detect that the first longitudinal pathway 170A of the first rear conveyor assembly 160A is positioned over the edge of the obstacle surface 210 in a variety of manners. For example, in some embodiments, the assistive robot 100 may detect that the first rear conveyor assembly 160A is positioned over the obstacle surface 210 with the travel sensor 186. The travel sensor 186 may detect a distance travelled by the assistive robot 100 over the edge of the obstacle 200, for example, the distance travelled by the assistive robot 100 in the longitudinal direction evaluated from the initial engagement of the first front wheel 122A with the surface 220 below the obstacle 200 (e.g., as shown in FIG. 7C). Once the travel sensor 186 detects that the assistive robot 100 has travelled forward over the edge of the obstacle 200 by a predetermined distance that corresponds to a distance evaluated from the front end 114 of the assistive robot 100 to the first longitudinal pathway 170A of the first rear conveyor assembly 160A, the controller 182 may determine that the first longitudinal pathway 170A is positioned over the edge of obstacle 200.

Referring collectively to FIGS. 5, 7E, 7F, and 7G with the first rear toe 164A engaged with the obstacle surface 210, the assistive robot 100 may be supported by the first rear toe 164A on the obstacle surface 210 and the first front wheel 122A on the surface 220 below the obstacle 200. As the first rear conveyor 162A continues to rotate in the clockwise direction, the first rear toe 164A moves toward the first vertical pathway 168A of the first rear conveyor assembly 160A, and as the first rear toe 164A moves upward along the first vertical pathway 168A, the first front wheel 122A may simultaneously be drawn upward and toward the chassis body 118 in the vertical direction. The upward movement of the first rear toe 164A and the first front wheel 122A cause the chassis body 118 to move downward in the vertical direction toward the surface 220 below the obstacle 200. The chassis body 118 continues to move downward until the assistive robot 100 is supported on the surface 200 below the obstacle by the first front wheel 122A and the first rear wheel 132A.

In some embodiments, for example in embodiments in which the first rear conveyor 162A does not include the first vertical pathway 168A, the controller 182 may direct the first rear wheel assembly 130A to lower the first rear wheel 132A (i.e., from the retracted position to the extended position) to engage the surface 220 below the obstacle 200 once the first rear wheel 132A is positioned over the surface 220.

It should now be understood that assistive robots disclosed herein include conveyor assemblies that assist in moving the assistive robot upward onto and downward from an obstacle. The conveyor assemblies include conveyors and toes that extend outward from the conveyors. The toes may be selectively engaged with the obstacle to support the assistive robot as wheels of the robot are moved between an extended position and a retracted position to move the assistive robot upward onto and downward from an obstacle. Through the coordinated movement of the wheels of the assistive robot and the conveyor assemblies, assistive robots according to the present disclosure may traverse comparatively high obstacles while maintaining a stable orientation.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assistive robot comprising:
   a manipulator;
   a base coupled to the manipulator, the base defining a front end and a rear end positioned opposite the front end, the base comprising:
   a chassis body;
   a front conveyor assembly positioned at the front end of the base, the front conveyor assembly comprising:
   a front conveyor defining a conveyor pathway that extends at least partially within the chassis body and a front toe extending outward from the front conveyor; and
   a rear conveyor assembly positioned at the rear end of the base, the rear conveyor assembly comprising:
   a rear conveyor defining a conveyor pathway that extends at least partially within the chassis body and a rear toe extending outward from the rear conveyor.

2. The assistive robot of claim 1, wherein the conveyor pathway of at least one of the front conveyor and the rear conveyor defines a vertical pathway extending in a vertical direction and a longitudinal pathway that extends in a longitudinal direction that is oriented transverse to the vertical pathway.

3. The assistive robot of claim 2, wherein the vertical pathway and the longitudinal pathway are positioned at least partially outside of the chassis body.

4. The assistive robot of claim 1, further comprising:
a front wheel positioned at the front end of the base and coupled to the chassis body; and
a rear wheel positioned at the rear end of the base and coupled to the chassis body, wherein at least one of the front wheel and the rear wheel are repositionable between an extended position and a retracted position, wherein the at least one of the front wheel and the rear wheel is positioned closer to the chassis body in a vertical direction in the retracted position as compared to the extended position.

5. The assistive robot of claim 1, wherein the front conveyor assembly is a first front conveyor assembly and the front conveyor is a first front conveyor, and the assistive robot further comprises a second front conveyor assembly comprising a second front conveyor aligned with the first front conveyor, the second front conveyor defining a conveyor pathway that extends at least partially within the chassis body, wherein the second front conveyor assembly comprises a second front toe extending outward from the second front conveyor.

6. The assistive robot of claim 1, further comprising an distance sensor communicatively coupled to the front conveyor assembly and the rear conveyor assembly.

7. A vehicle comprising:
a base defining a front end and a rear end positioned opposite the front end, the base comprising:
a chassis body;
a front conveyor assembly positioned at the front end of the base, the front conveyor assembly comprising:
a front conveyor defining a conveyor pathway that extends at least partially within the chassis body and a front toe extending outward from the front conveyor; and
a rear conveyor assembly positioned at the rear end of the base, the rear conveyor assembly comprising:
a rear conveyor defining a conveyor pathway that extends at least partially within the chassis body and a rear toe extending outward from the rear conveyor; and
a front wheel assembly positioned at the front end of the base and coupled to the chassis body, the front wheel assembly comprising a front wheel; and
a controller communicatively coupled to the front conveyor assembly, the rear conveyor assembly, and the front wheel assembly, the controller comprising a processor and a computer readable and executable instruction set, which when executed, causes the processor to:
direct the vehicle to move toward an obstacle;
direct the vehicle to move upward in a vertical direction such the obstacle is positioned below the conveyor pathway of the front conveyor;
direct the front conveyor assembly to engage the front toe with the obstacle;
direct the front conveyor assembly to move the front conveyor and the front toe in a rearward direction to move the vehicle over the obstacle; and
direct the rear conveyor assembly to engage the rear toe of the rear conveyor with the obstacle.

8. The vehicle of claim 7, wherein, to direct the vehicle to move upward in the vertical direction, the executable instruction set, when executed further causes the processor to:
direct the front wheel assembly to move the front wheel from a retracted position into an extended position, wherein the front wheel is positioned closer to the chassis body of the vehicle in the retracted position as compared to the extended position.

9. The vehicle of claim 7, wherein, to direct the vehicle to move upward in the vertical direction, the executable instruction set, when executed further causes the processor to:
direct the front conveyor assembly to engage the front toe with the obstacle and move the front toe along a vertical pathway defined by the front conveyor.

10. The vehicle of claim 7, wherein the executable instruction set, when executed, further causes the processor to:
direct the rear conveyor assembly to move the rear toe of the rear conveyor along a longitudinal pathway defined by the rear conveyor.

11. The vehicle of claim 10, wherein the vehicle further comprises a rear wheel assembly communicatively coupled to the controller and comprising a rear wheel coupled to the chassis body, and wherein the executable instruction set, when executed, further causes the processor to:
subsequent to directing the rear conveyor assembly to move the rear toe along the longitudinal pathway defined by the rear conveyor, direct the rear wheel assembly to engage the rear wheel with the obstacle.

12. The vehicle of claim 7, further comprising an distance sensor communicatively coupled to the controller, and wherein the executable instruction set, when executed further causes the processor to detect a height of the obstacle evaluated in the vertical direction with the distance sensor.

13. The vehicle of claim 7, further comprising a travel sensor communicatively coupled to the controller, and wherein the executable instruction set, when executed further causes the processor to:
detect a distance the vehicle has travelled over the obstacle with the travel sensor; and
direct the rear conveyor assembly to engage the rear toe in response to determining that the detected distance the vehicle has travelled over the obstacle exceeds a predetermined distance.

* * * * *